US012809426B2

(12) United States Patent
Choi et al.

(10) Patent No.: US 12,809,426 B2
(45) Date of Patent: Nov. 24, 2026

(54) ELECTRONIC DEVICE INCLUDING KEYBOARD

(71) Applicant: Samsung Electronics Co., Ltd., Suwon-si (KR)

(72) Inventors: Donguk Choi, Suwon-si (KR); Sungkoo Park, Suwon-si (KR); Jangsun Yoo, Suwon-si (KR); Himchan Yun, Suwon-si (KR); Kyungjae Lee, Suwon-si (KR); Kookjoo Lee, Suwon-si (KR); Soonho Hwang, Suwon-si (KR); Seunghwan Kim, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/079,007

(22) Filed: Mar. 13, 2025

(65) Prior Publication Data

US 2025/0208662 A1 Jun. 26, 2025

Related U.S. Application Data

(63) Continuation of application No. PCT/KR2023/013716, filed on Sep. 13, 2023.

(30) Foreign Application Priority Data

Sep. 13, 2022 (KR) ........................ 10-2022-0115072
Dec. 8, 2022 (KR) ........................ 10-2022-0170848

(51) Int. Cl.
*G06F 1/16* (2006.01)

(52) U.S. Cl.
CPC .......... *G06F 1/1662* (2013.01); *G06F 1/1681* (2013.01); *G06F 1/1683* (2013.01)

(58) Field of Classification Search
CPC .... G06F 1/1662; G06F 1/1681; G06F 1/1683; G06F 1/1616; G06F 1/1656; G06F 1/16; G06F 1/1698
See application file for complete search history.

(56) References Cited

U.S. PATENT DOCUMENTS 9,596,330 B2 3/2017 Caballero et al.
10,629,982 B2 4/2020 Kim et al.
(Continued)

FOREIGN PATENT DOCUMENTS

JP 2021018572 A 2/2021
KR 20100084412 A 7/2010
(Continued)

OTHER PUBLICATIONS

Extended European Search Report dated Nov. 13, 2025 issued in European Patent Application No. 23865841.3.
(Continued)

*Primary Examiner* — Sahlu Okebato
(74) *Attorney, Agent, or Firm* — Nixon & Vanderhye P.C.

(57) ABSTRACT

Disclosed is an electronic device comprising: a housing comprising a first surface facing in a first direction, a second surface facing in a second direction opposite to the first direction, and a side surface surrounding at least a portion of a space between the first surface and the second surface; a first conductive part arranged along a first part of the side surface; a second conductive part arranged along a second part of the side surface; a first segmentation portion disposed between the first conductive part and the second conductive part and electrically isolating the first conductive part and the second conductive part from each other, a keyboard exposed to the outside through the first surface; a communication circuit arranged inside the housing; and a processor arranged inside the housing and electrically connected to the keyboard and the communication circuit, wherein, based on
(Continued)

the electronic device being arranged to overlap a partial area of an external electronic device, the first segmentation portion is aligned with a second segmentation portion arranged at a side surface portion of a housing of the external electronic device.

23 Claims, 21 Drawing Sheets

(56) References Cited

U.S. PATENT DOCUMENTS

| | | | |
|---|---|---|---|
| 10,833,397 B2 | 11/2020 | Lee et al. | |
| 11,048,304 B2 | 6/2021 | Kang et al. | |
| 11,470,729 B2 | 10/2022 | Kim et al. | |
| 11,526,214 B2 | 12/2022 | Nakata et al. | |
| 2003/0021082 A1 | 1/2003 | Lu et al. | |
| 2005/0099403 A1 | 5/2005 | Kraus et al. | |
| 2016/0327980 A1* | 11/2016 | Farahani | G06F 1/1688 |
| 2017/0117623 A1 | 4/2017 | Chan et al. | |
| 2017/0346164 A1 | 11/2017 | Kim et al. | |
| 2020/0166973 A1* | 5/2020 | Kang | H05K 5/03 |
| 2020/0183465 A1* | 6/2020 | Yoo | H01Q 1/2258 |
| 2021/0018989 A1* | 1/2021 | Nakata | H04B 5/26 |
| 2021/0037123 A1 | 2/2021 | Kim et al. | |
| 2021/0219437 A1* | 7/2021 | Kim | G06F 1/1652 |
| 2023/0299466 A1 | 9/2023 | An et al. | |

FOREIGN PATENT DOCUMENTS

| | | |
|---|---|---|
| KR | 20130101091 A | 9/2013 |
| KR | 20170116262 A | 10/2017 |
| KR | 20170133952 A | 12/2017 |
| KR | 20180127861 A | 11/2018 |
| KR | 20190143029 A | 12/2019 |
| KR | 20200027734 A | 3/2020 |
| KR | 20220036659 A | 3/2022 |
| KR | 20220063681 A | 5/2022 |
| KR | 20220077434 A | 6/2022 |

OTHER PUBLICATIONS

International Search Report and Written Opinion of the ISA for PCT/KR2023/013716, mailed Dec. 18, 2023, 9 pages.

* cited by examiner

ELECTRONIC DEVICE INCLUDING KEYBOARD

CROSS-REFERENCE TO RELATED APPLICATIONS

This application is a continuation of International Application No. PCT/KR2023/013716 designating the United States, filed on Sep. 13, 2023, in the Korean Intellectual Property Receiving Office and claiming priority to Korean Patent Application Nos. 10-2022-0115072, filed on Sep. 13, 2022, and 10-2022-0170848, filed on Dec. 8, 2022, in the Korean Intellectual Property Office, the disclosures of each of which are incorporated by reference herein in their entireties.

BACKGROUND

Field

The disclosure relates to an electronic device including a keyboard.

Description of Related Art

Portable electronic devices such as smartphones or tablet PCs can facilitate user operations through a graphic user interface (GUI) environment that uses a data touch screen, and can provide various multimedia that are based on a web environment.

These portable electronic devices can be wiredly or wirelessly connected to an accessory device for supporting various additional functions. For example, the portable electronic device can be wirelessly connected to an electronic device including a keyboard, and can receive a user input through the keyboard wirelessly connected.

Depending on the usage environment of the portable electronic device, the electronic device including the keyboard can be used spaced a certain distance apart from the portable electronic device or can be used arranged to overlap (or fastened to) a partial area of the portable electronic device. For example, when the portable electronic device operates in a desktop mode or a canvas mode, the electronic device including the keyboard can be used spaced apart from the portable electronic device, and when the portable electronic device operates in a laptop mode, the electronic device including the keyboard can be used disposed on (or fastened to) a lower end portion of the portable electronic device.

When an electronic device is used arranged to overlap (or fastened to) a partial area of a portable electronic device, a conductive member included in the electronic device may deteriorate the radiation performance of an antenna arranged in the portable electronic device.

SUMMARY

Various embodiments of the disclosure may provide an electronic device having a structure including a segmentation portion between conductive parts, and in which, when the electronic device is arranged to overlap (or is fastened to) a partial area of a portable electronic device, the segmentation portion is arranged at a position aligned with a segmentation portion formed between conductive members used as an antenna radiator of the portable electronic device.

An electronic device according to various example embodiments of the disclosure may include: a housing including a first surface facing in a first direction, a second surface facing in a second direction opposite to the first direction, and a side surface surrounding at least a portion of a space between the first surface and the second surface, a first conductive part including a conductive material arranged along a first part of the side surface portion, a second conductive part comprising a conductive material arranged along a second part of the side surface, a first segmentation portion comprising a non-conductive material formed between the first conductive part and the second conductive part, and electrically isolating the first conductive part from the second conductive part, a keyboard exposed to an outside through the first surface, a communication circuit arranged inside the housing, and at least one processor, comprising processing circuitry, arranged inside the housing and electrically connected to the keyboard and the communication circuit, and based on the electronic device overlapping a partial area of an external electronic device, the first segmentation portion may be aligned with a second segmentation portion comprising a non-conductive material arranged at a side surface portion of a housing of the external electronic device.

An electronic device according to various example embodiments of the disclosure may include: a housing, a plate arranged inside the housing, a first conductive part comprising a conductive material arranged along a first part of a side surface of the plate, a second conductive part comprising a conductive material arranged along a second part of the side surface of the plate, a first segmentation portion comprising a non-conductive material formed between the first conductive part and the second conductive part, and electrically isolating the first conductive part from the second conductive part, a keyboard seated on the plate and exposed to an outside, a communication circuit arranged inside the housing, and at least one processor, comprising processing circuitry, arranged inside the housing, and electrically connected to the keyboard and the communication circuit, and based on the electronic device overlapping a partial area of an external electronic device, the first segmentation portion may be aligned with a second segmentation portion comprising a non-conductive material arranged at a side surface of a housing of the external electronic device.

According to various example embodiments of the disclosure, an electronic device may have a segmentation portion arranged at a position aligned with a segmentation portion formed in a portable electronic device, thereby preventing or reducing the deterioration of the radiation performance of an antenna of the portable electronic device.

In addition, various effects directly or indirectly identified through present disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may be used for the same or similar components.

DETAILED DESCRIPTION

Figure 1:
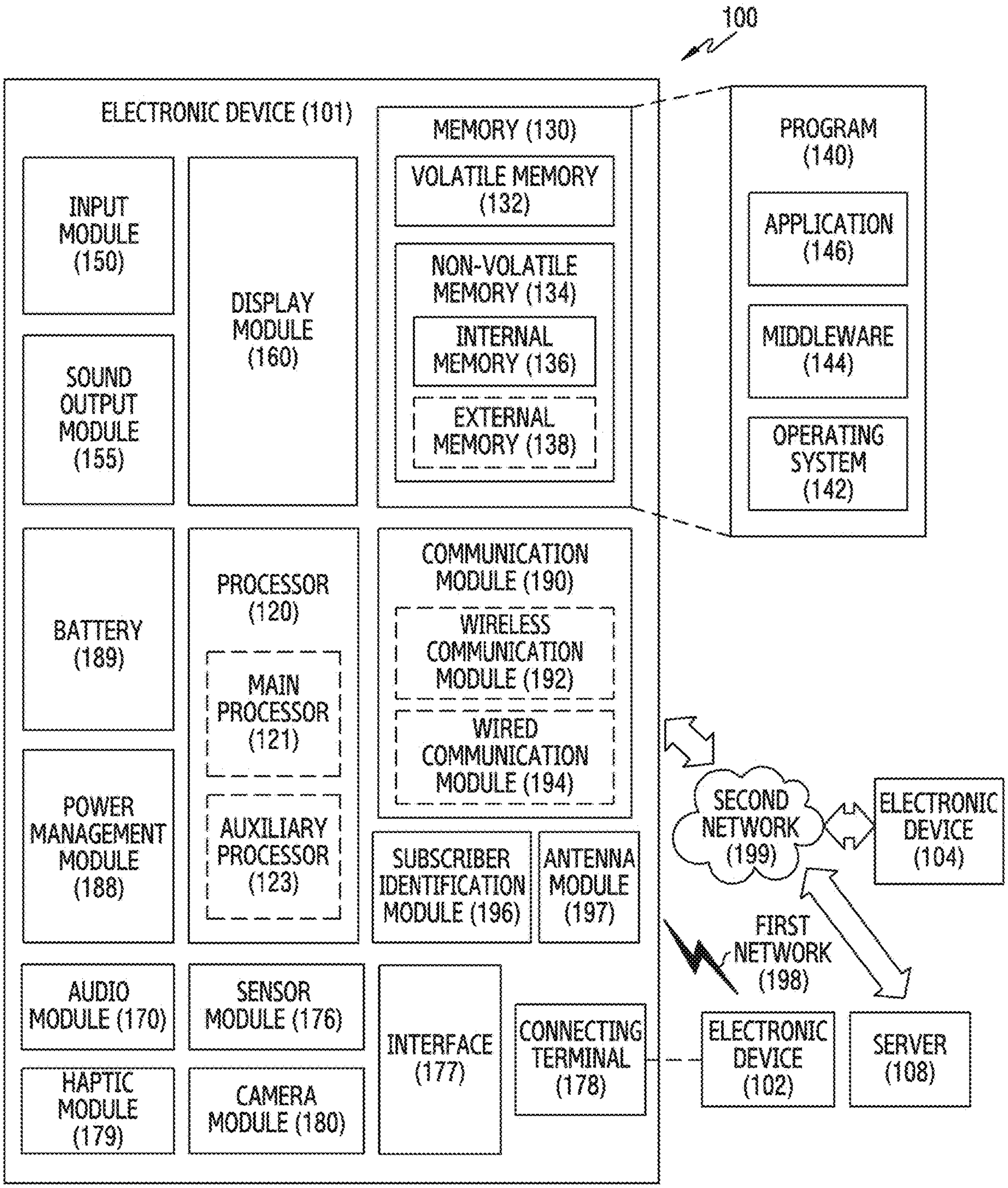
FIG. 1 is a block diagram illustrating an example electronic device in a network environment according to various embodiments.

Various embodiments of the disclosure are described in greater detail below with reference to the accompanying drawings. For the convenience of explanation, the components illustrated in the drawings may be exaggerated or reduced in size, and the disclosure is not necessarily limited by what is illustrated.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device 200 (e.g., electronic device 101 of FIG. 1) mentioned in the following description may be wiredly or wirelessly connected to an external electronic device (e.g., portable electronic device), and support various additional functions of the external electronic device. In an example, the electronic device 200 may be connected to the external electronic device by wireless communication (e.g., Bluetooth communication), and may be used as an input means of the external electronic device by transmitting a user input (e.g., key input or touch input) received through a keyboard 230 included in the electronic device 200 to the external electronic device. In the following description, for the convenience of explanation, the electronic device 200 is described as a device including the keyboard 230 used as the input means of the external electronic device, but the electronic device 200 is not limited thereto. According to various embodiments, the electronic device 200 may include an accessory device that may be wiredly or wirelessly connected to the external electronic device and support various additional functions of the external electronic device. For example, the electronic device 200 may include a touch pad.

According to an embodiment, depending on the usage environment of the external electronic device, the electronic device 200 may be used spaced a certain distance apart from the external electronic device, or may be used arranged to overlap (or fastened to) a partial area of the external electronic device. For example, when the external electronic device operates in a desktop mode or a canvas mode, the electronic device 200 may be used spaced apart from the external electronic device, and when the external electronic device operates in a laptop mode, the electronic device 200 may be used disposed on (or fastened to) a lower end portion of the external electronic device.

When the electronic device 200 is used arranged to overlap (or fastened to) a partial area of the external electronic device, a conductive part included in the electronic device 200 may deteriorate the radiation performance of an antenna arranged in the external electronic device. According to an embodiment, in order to prevent or avoid this, the electronic device 200 may have a structure including a segmentation portion between conductive parts, and when the electronic device 200 is arranged to overlap (or is fastened to) a partial area of the external electronic device, the segmentation portion may be arranged at a position aligned with a segmentation portion formed between conductive members used as antenna radiators of the external electronic device.

Figure 2:
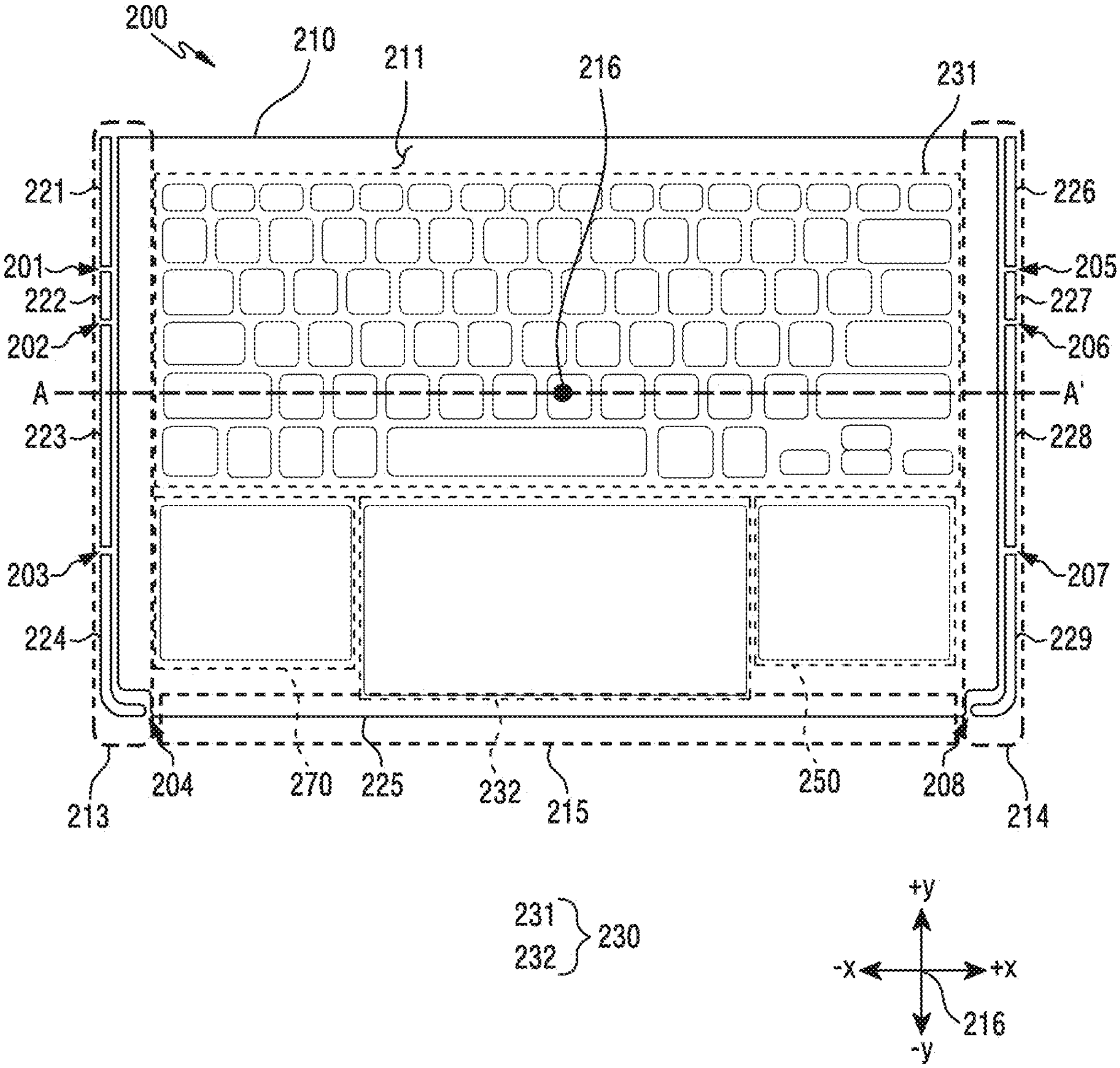
FIG. 2 is a diagram illustrating an electronic device including a segmentation portion formed in a housing according to various embodiments.
Figure 3:
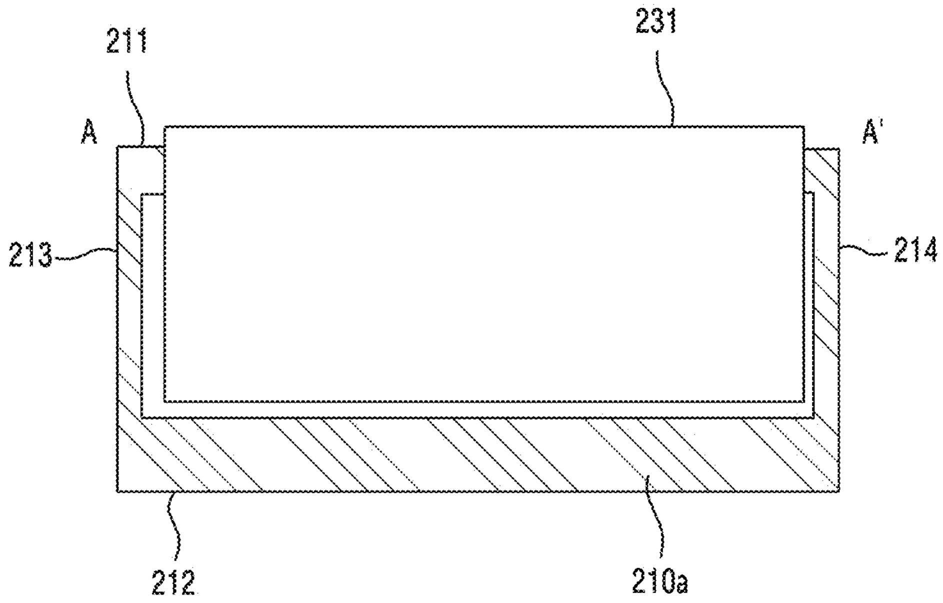
FIG. 3 is a cross-sectional view taken along line A-A' of FIG. 2 when the housing of the electronic device of FIG. 2 includes a metal body according to various embodiments.
Figure 4:
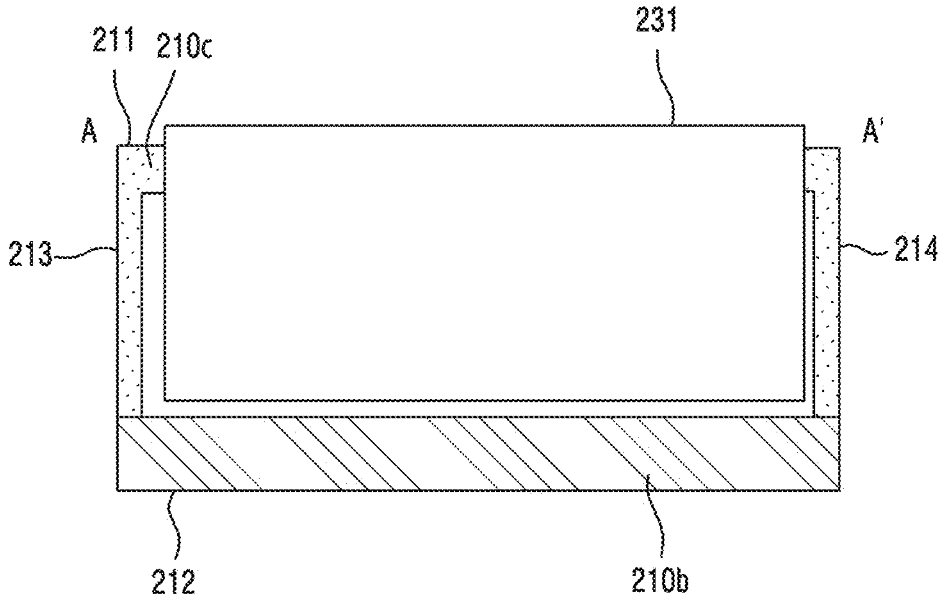
FIG. 4 is a cross-sectional vie taken along line A-A' of FIG. 2 when the housing of the electronic device of FIG. 2 includes a metal plate according to various embodiments.

According to an embodiment, the conductive part and the segmentation portion included in the electronic device 200 may be arranged at a side surface portion of a housing 210 of the electronic device 200. According to an embodiment, the conductive part and the segmentation portion included in the electronic device 200 may be arranged at a side surface portion of a plate arranged inside the housing 210 of the electronic device 200. FIGS. 2 to 4 may show a structure in which the conductive part and the segmentation portion are arranged at the side surface portion of the housing 210 of the electronic device 200, and FIGS. 5 and 6 may show a structure in which the conductive part and the segmentation portion are arranged at the side surface portion of the plate arranged inside the housing 210 of the electronic device 200.

FIG. 2 is a diagram illustrating an example electronic device including a segmentation portion formed in a housing according to various embodiments, FIG. 3 is a cross-sectional vie taken along line A-A' of FIG. 2 when the housing of the electronic device of FIG. 2 includes a metal body according to various embodiments, and FIG. 4 is a cross-sectional view taken along line A-A' of FIG. 2 when the housing of the electronic device of FIG. 2 includes a metal plate according to various embodiments.

Referring to FIGS. 2, 3 and 4 (which may be referred to as FIGS. 2 to 4), an electronic device 200 may include a housing 210, a keyboard 230, a printed circuit board 250, and a battery 270. However, the construction of the electronic device 200 is not limited thereto. According to various embodiments, the electronic device 200 may omit at least one of the above-described components, and may further include at least one other component as well.

The housing 210 may include a first surface (or front surface) 211 facing a first direction, a second surface (or rear surface) 212 facing a second direction opposite to the first direction, and a side surface portion 213, 214 or 215 surrounding at least a portion of a space between the first surface 211 and the second surface 212. At least a portion of the housing 210 may include a conductive part (e.g., conductive member). According to an embodiment, the housing 210 may include a metal body. For example, as disclosed in FIG. 3, the front surface 211 and the rear surface 212 of the housing 210 may include a conductive member **210*a* (or conductive part) such as a metal material. According to an embodiment, the housing 210 may include a metal plate. For example, as disclosed in FIG. 4, the rear surface 212 of the housing 210 may include a conductive member 210*b* (or conductive part) such as a metal material, and the front surface 211 of the housing 210 may include a non-conductive member 210*c*** (or non-conductive part) such as a plastic material (e.g., polycarbonate).

A portion of the side surface portion 213, 214 or 215 of the housing 210 may include a conductive part (e.g., conductive member). According to an embodiment, at least one conductive part may be arranged along a portion of the side surface portion 213, 214 or 215 of the housing 210. For example, as disclosed in FIG. 2, a first conductive part 221, a second conductive part 222, a third conductive part 223, and/or a fourth conductive part 224 may be arranged along a portion of the first side surface portion 213 (e.g., left side surface portion) of the housing 210. In addition, a sixth conductive part 226, a seventh conductive part 227, an eighth conductive part 228, and/or a ninth conductive part 229 may be arranged along a portion of the second side surface portion 214 (e.g., right side surface portion) of the housing 210. In addition, a fifth conductive part 225 may be arranged along a portion of the third side surface portion 215 (e.g., lower side surface portion) of the housing 210. The first side surface portion 213 may include one end portion in a −x-axis direction with respect to a center point 216 of the housing 210. The second side surface portion 214 may include one end portion in a +x-axis direction with respect to the center point 216 of the housing 210. The third side surface portion 215 may include one end portion in a −y-axis direction with respect to the center point 216 of the housing 210. In this case, the first conductive part 221 may be arranged at a first position (e.g., one end in a +y-axis direction) of the first side surface portion 213. The second conductive part 222 may be arranged at a second position of the first side surface portion 213 in a −y-axis direction of the first conductive part 221. The third conductive part 223 may be arranged at a third position of the first side surface portion 213 in the −y-axis direction of the second conductive part 222. The fourth conductive part 224 may be arranged at a fourth position of the first side surface portion 213 in the −y-axis direction of the third conductive part 223. The fifth conductive part 225 may be arranged at a fifth position of the third side surface portion 215. The sixth conductive part 226 may be arranged at a sixth position (e.g., one end in the +y-axis direction) of the second side surface portion 214. The seventh conductive part 227 may be arranged at a seventh position of the second side surface portion 214 in the −y-axis direction of the sixth conductive part 226. The eighth conductive part 228 may be arranged at an eighth position of the second side surface portion 214 in the −y-axis direction of the seventh conductive part 227. The ninth conductive part 229 may be arranged at a ninth position of the second side surface portion 214 in the −y-axis direction of the eighth conductive part 228. However, the number and arrangement positions of the conductive parts arranged along a portion of the side surface portion 213, 214 or 215 of the housing 210 are not limited thereto.

According to an embodiment, at least one segmentation portion may be formed between the conductive parts formed on a portion of the side surface portion 213, 214 or 215 of the housing 210, and electrically isolate the conductive parts from each other. For example, as disclosed in FIG. 2, a first segmentation portion 201 may be formed between the first conductive part 221 and the second conductive part 222, and electrically isolate the first conductive part 221 from the second conductive part 222. A second segmentation portion 202 may be formed between the second conductive part 222 and the third conductive part 223, and electrically isolate the second conductive part 222 from the third conductive part 223. A third segmentation portion 203 may be formed between the third conductive part 223 and the fourth conductive part 224, and electrically isolate the third conductive part 223 from the fourth conductive part 224. A fourth segmentation portion 204 may be formed between the fourth conductive part 224 and the fifth conductive part 225, and electrically isolate the fourth conductive part 224 from the fifth conductive part 225. A fifth segmentation portion 205 may be formed between the sixth conductive part 226 and the seventh conductive part 227, and electrically isolate the sixth conductive part 226 from the seventh conductive part 227. A sixth segmentation portion 206 may be formed between the seventh conductive part 227 and the eighth conductive part 228, and electrically isolate the seventh conductive part 227 from the eighth conductive part 228. A seventh segmentation portion 207 may be formed between the eighth conductive part 228 and the ninth conductive part 229, and electrically isolate the eighth conductive part 228 from the ninth conductive part 229. An eighth segmentation portion 208 may be formed between the ninth conductive part 229 and the fifth conductive part 225, and electrically isolate the ninth conductive part 229 from the fifth conductive part 225. However, the number of the segmentation portions is not limited thereto. For example, the at least one segmentation portion may include the first segmentation portion 201, the second segmentation portion 202, the third segmentation portion 203, the fourth segmentation portion 204, the fifth segmentation portion 205, the sixth segmentation portion 206, the seventh segmentation portion 207, or the eighth segmentation portion 208.

According to an embodiment, when the electronic device 200 may be arranged to overlap (or is fastened to) a partial area of the external electronic device, the at least one segmentation portion of the electronic device 200 may be arranged at a position aligned with a segmentation portion arranged at a side surface portion of a housing of the external electronic device. For example, the external electronic device may include an antenna using a conductive member segmented by the segmentation portion on the side surface portion of the housing of the external electronic device. For example, the external electronic device may include conductive members arranged along a portion of an edge of the housing of the external electronic device and a segmentation portion formed between the conductive members and electrically isolating the conductive members from each other, and at least one of the conductive members of the external electronic device may be used as an antenna radiator of the external electronic device. In this case, when the electronic device 200 is arranged to overlap (or is fastened to) a partial area of the external electronic device, the at least one segmentation portion of the electronic device 200 may be arranged at a position aligned with the segmentation portion arranged at the side surface portion of the housing of the external electronic device, and reduce or prevent the deterioration of the radiation performance of the antenna of the external electronic device. The arrangement position of the at least one segmentation portion of the electronic device 200 will be described in greater detail below with reference to FIGS. 9, 12, 13, 14, and 15.

According to an embodiment, the at least one segmentation portion of the electronic device 200 may include a non-conductive member (e.g., including a non-conductive material). In an example, the non-conductive member may fill at least a portion of the at least one segmentation portion of the electronic device 200.

The keyboard 230 (or key assembly or key input device) may be exposed to the outside through the front surface 211 of the housing 210 and receive a user input (e.g., key input or touch input). According to an embodiment, the keyboard 230 may include a key area 231 in which at least one key button is arranged. The keyboard 230 may receive a key input through the at least one key button. According to an embodiment, the keyboard 230 may include the key area 231, and a touch area 232 for receiving a touch input. The touch area 232 may include, for example, a touch pad.

The printed circuit board 250 may be arranged inside the housing 210. For example, the printed circuit board 250 may be arranged between the front surface 211 and the rear surface 212 of the housing 210. Various electronic components and circuits may be mounted on the printed circuit board 250. For example, a processor, a communication circuit, and/or a memory may be mounted on the printed circuit board 250.

The processor (e.g., processor 120 of FIG. 1) may include various processing circuitry and control at least one component of the electronic device 200, and perform various data processing or calculations. According to an embodiment, the processor may execute an instruction stored in the memory included in the electronic device 200 and perform a function related to processing of a user input. The description of the processor 120 above applies equally to the processor described here.

The communication circuit (e.g., communication module 190 of FIG. 1) may support communication between the electronic device 200 and an external electronic device. For example, the communication circuit may establish wired communication or wireless communication complying with a prescribed communication protocol with the external electronic device, and transmit and receive signals or data with the external electronic device.

The memory (e.g., memory 130 of FIG. 1) may store various data used by at least one component of the electronic device 200. According to an embodiment, the memory may store an instruction related to processing of a user input, and data. In this case, the instruction may be executed by the processor.

The battery 270 may be arranged inside the housing 210. For example, the battery 270 may be arranged between the front surface 211 and the rear surface 212 of the housing 210. The battery 270 may supply power to at least one component of the electronic device 200.

Figure 5:
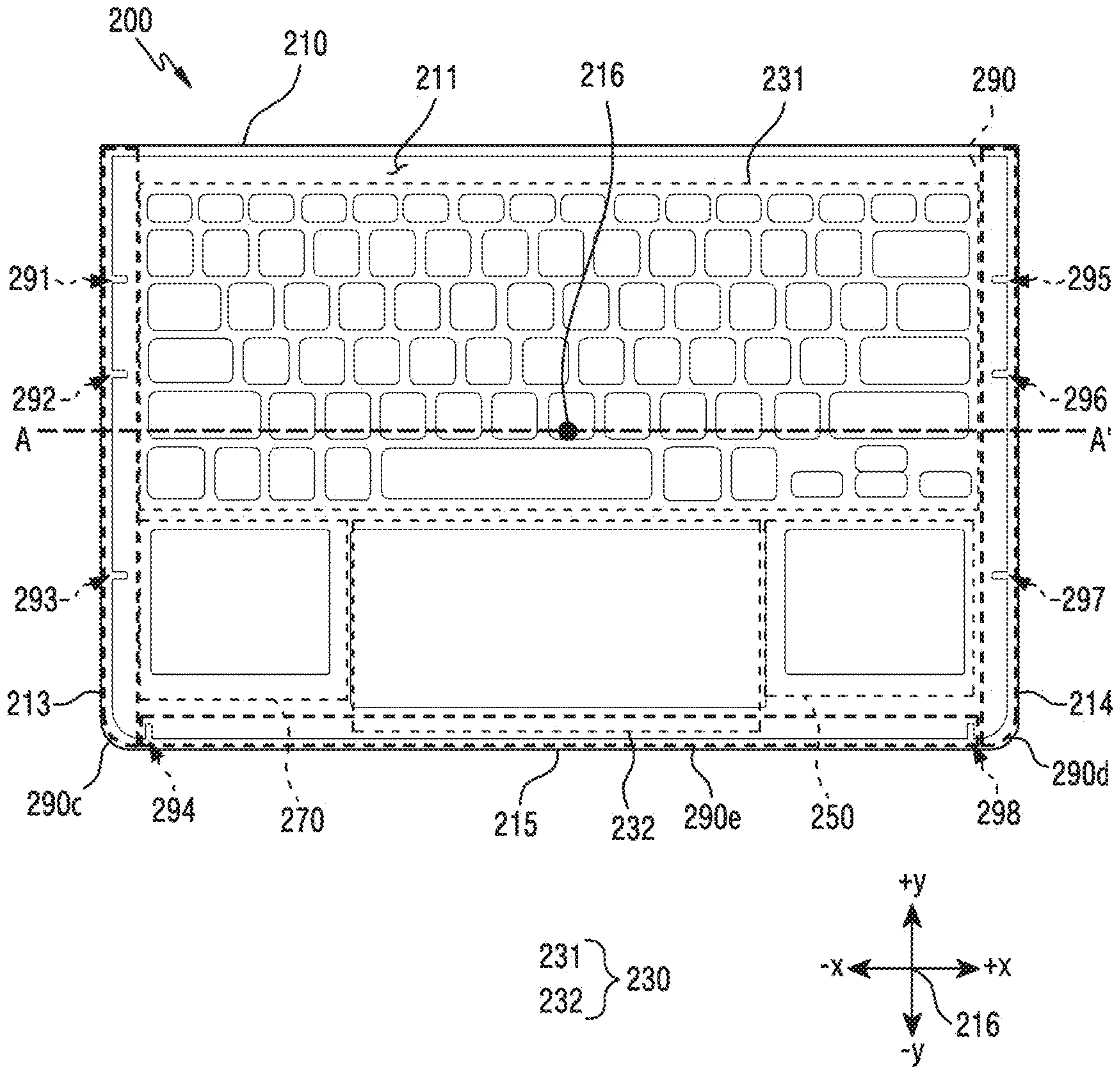
FIG. 5 is a diagram illustrating an electronic device including a segmentation portion formed in a bracket according to various embodiments.
Figure 6:
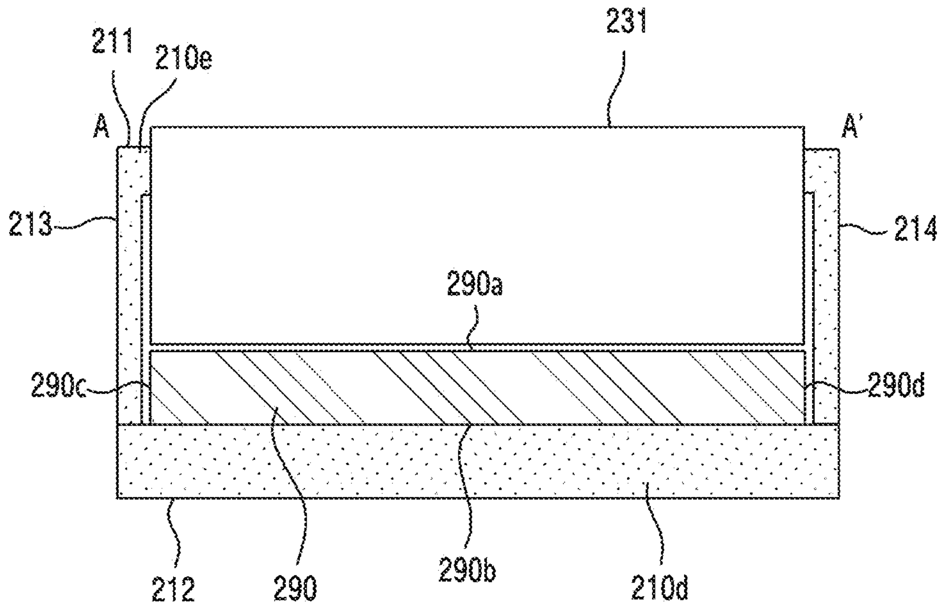
FIG. 6 is a cross-sectional view taken along line A-A' of FIG. 5 according to various embodiments.

FIG. 5 is a diagram illustrating an electronic device including a segmentation portion formed in a bracket according to various embodiments, and FIG. 6 is a cross-sectional view taken along line A-A' of FIG. 5 according to various embodiments.

Referring to FIGS. 5 and 6, an electronic device 200 may include a housing 210, a keyboard 230, a printed circuit board 250, a battery 270, and a plate 290. However, the construction of the electronic device 200 is not limited thereto. According to various embodiments, the electronic device 200 may omit at least one of the above-described components, and may further include at least one other component as well. In FIGS. 5 and 6, descriptions of components identical or similar to those of FIGS. 5 and 6 among the components described in FIGS. 2 to 4 may not be repeated here.

The housing 210 may include a first surface (or front surface) 211 facing a first direction, a second surface (or rear surface) 212 facing a second direction opposite to the first direction, and a side surface portion 213, 214 or 215 surrounding at least a portion of a space between the first surface 211 and the second surface 212. The housing 210 may include non-conductive members 210*d* and 210*e*. For example, as disclosed in FIG. 6, the rear surface 212 of the housing 210 may include the non-conductive member 210*d* such as a plastic material (e.g., polycarbonate), and the front surface 211 of the housing 210 may also include the non-conductive member 210*e* such as a plastic material.

The keyboard 230, the printed circuit board 250, and the battery 270 may each include the same or similar constructions as the keyboard 230, the printed circuit board 250, and the battery 270 described in FIGS. 2 to 4.

The plate 290 may be arranged inside the housing 210. For example, the plate 290 may be arranged between the front surface 211 and the rear surface 212 of the housing 210. The plate 290 may include a front surface 290*a* facing the first direction, a rear surface 290*b* facing the second direction opposite to the first direction, and a side surface portion 290*c*, 290*d* or 290*e* surrounding at least a portion of a space between the front surface 290*a* and the rear surface 290*b*. According to an embodiment, the plate 290 may provide a space in which the keyboard 230 and the printed circuit board 250 may be seated, and may support the keyboard 230 and the printed circuit board 250 seated in the space. For example, the plate 290 may include a bracket or a supporting member.

According to an embodiment, the plate 290 may include a conductive part (e.g., conductive member). According to an embodiment, at least one conductive part may be arranged along a portion of the side surface portion 290*c*, 290*d* or 290*e* of the plate 290. According to an embodiment, the plate 290 may be a metal plate including a metal material. For example, as illustrated in FIG. 5, the plate 290 may include a conductive member formed integrally.

According to an embodiment, at least one segmentation portion may be formed between the conductive parts formed along a portion of the side surface portion 290*c*, 290*d* or 290*e* of the plate 290, and may electrically isolate the conductive parts from each other. For example, a first segmentation portion 291 may be formed between a first conductive part arranged at a first position (e.g., one end in a +y-axis direction) of the first side surface portion 290*c* (e.g., left side surface portion or one end portion in a −x-axis direction with respect to a center point 216 of the housing 210) of the plate 290 and a second conductive part arranged at a second position of the first side surface portion 290*c* in a −y-axis direction of the first conductive part, and may electrically isolate the first conductive part from the second conductive part. A second segmentation portion 292 may be formed between the second conductive part and a third conductive part arranged at a third position of the first side surface portion 290*c* in the −y-axis direction of the second conductive part, and may electrically isolate the second conductive part from the third conductive part. A third segmentation portion 293 may be formed between the third conductive part and a fourth conductive part arranged at a fourth position of the first side surface portion 290*c* in the −y-axis direction of the third conductive part, and may electrically isolate the third conductive part from the fourth conductive part. A fourth segmentation portion 294 may be formed between the fourth conductive part and a fifth conductive part arranged at a fifth position of the third side surface portion 290*e* (e.g., lower side surface portion or one end portion in the −y-axis direction with respect to the center point 216 of the housing 210) of the plate 290, and may electrically isolate the fourth conductive part from the fifth conductive part. A fifth segmentation portion 295 may be formed between a sixth conductive part arranged at a sixth position (e.g., one end in a +y-axis direction) of the second side surface portion 290*d* (e.g., right side surface portion or one end portion in the +x-axis direction with respect to the center point 216 of the housing 210) of the plate 290 and a seventh conductive part arranged at a seventh position of the second side surface portion 290*d* in the −y-axis direction of the sixth conductive part, and may electrically isolate the sixth conductive part from the seventh conductive part. A sixth segmentation portion 296 may be formed between the seventh conductive part and an eighth conductive part arranged at an eighth position of the second side surface portion 290*d* in the −y-axis direction of the seventh conductive part, and may electrically isolate the seventh conductive part from the eighth conductive part. A seventh segmentation portion 297 may be formed between the eighth conductive part and a ninth conductive part arranged at a ninth position of the second side surface portion 290*d* in the −y-axis direction of the eighth conductive part, and may electrically isolate the eighth conductive part from the ninth conductive part. An eighth segmentation portion 298 may be formed between the ninth conductive part and the fifth conductive part, and may electrically isolate the ninth conductive part from the fifth conductive part. However, the number of the segmentation portions is not limited thereto. For example, the at least one segmentation portion may include the first segmentation portion 291, the second segmentation portion 292, the third segmentation portion 293, the fourth segmentation portion 294, the fifth segmentation portion 295, the sixth segmentation portion 296, the seventh segmentation portion 297, or the eighth segmentation portion 298.

According to an embodiment, when the electronic device 200 is arranged to overlap (or is fastened to) a partial area of an external electronic device, the at least one segmentation portion of the electronic device 200 may be arranged at a position aligned with a segmentation portion arranged at a side surface portion of a housing of the external electronic device. For example, the external electronic device may include an antenna (e.g., metal housing antenna) that uses a conductive member segmented by the segmentation portion on the side surface portion of the housing of the external electronic device. For example, the external electronic device may include conductive members arranged along a portion of the side surface portion of the housing of the external electronic device and a segmentation portion formed between the conductive members and electrically isolating the conductive members from each other, and at least one of the conductive members of the external electronic device may be used as an antenna radiator of the external electronic device. In this case, when the electronic device 200 is arranged to overlap (or is fastened to) a partial area of the external electronic device, the at least one segmentation portion of the electronic device 200 may be arranged at the position aligned with the segmentation portion arranged at the side surface portion of the housing of the external electronic device, and reduce the deterioration of the radiation performance of the antenna of the external electronic device. The arrangement position of the at least one segmentation portion of the electronic device 200 will be described in greater detail below with reference to FIGS. 9, 12, 13, 14, and 15.

According to an embodiment, the at least one segmentation portion of the electronic device 200 may include a non-conductive member. In an example, the non-conductive member may fill at least a portion of the at least one segmentation portion of the electronic device 200.

Figure 7:
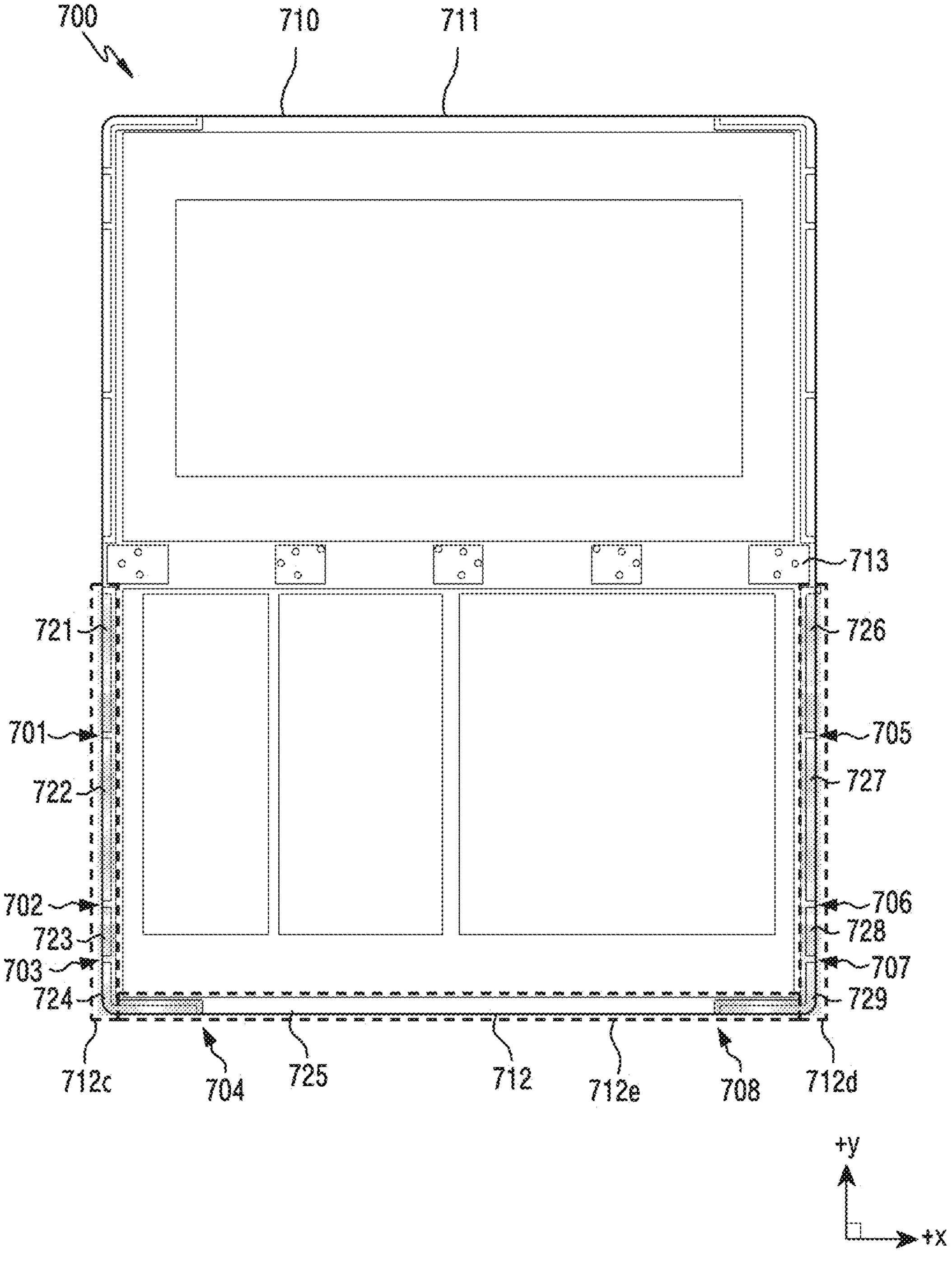
FIG. 7 is a diagram illustrating an antenna arrangement structure using a conductive member included in a portable electronic device according to various embodiments.
Figure 8:
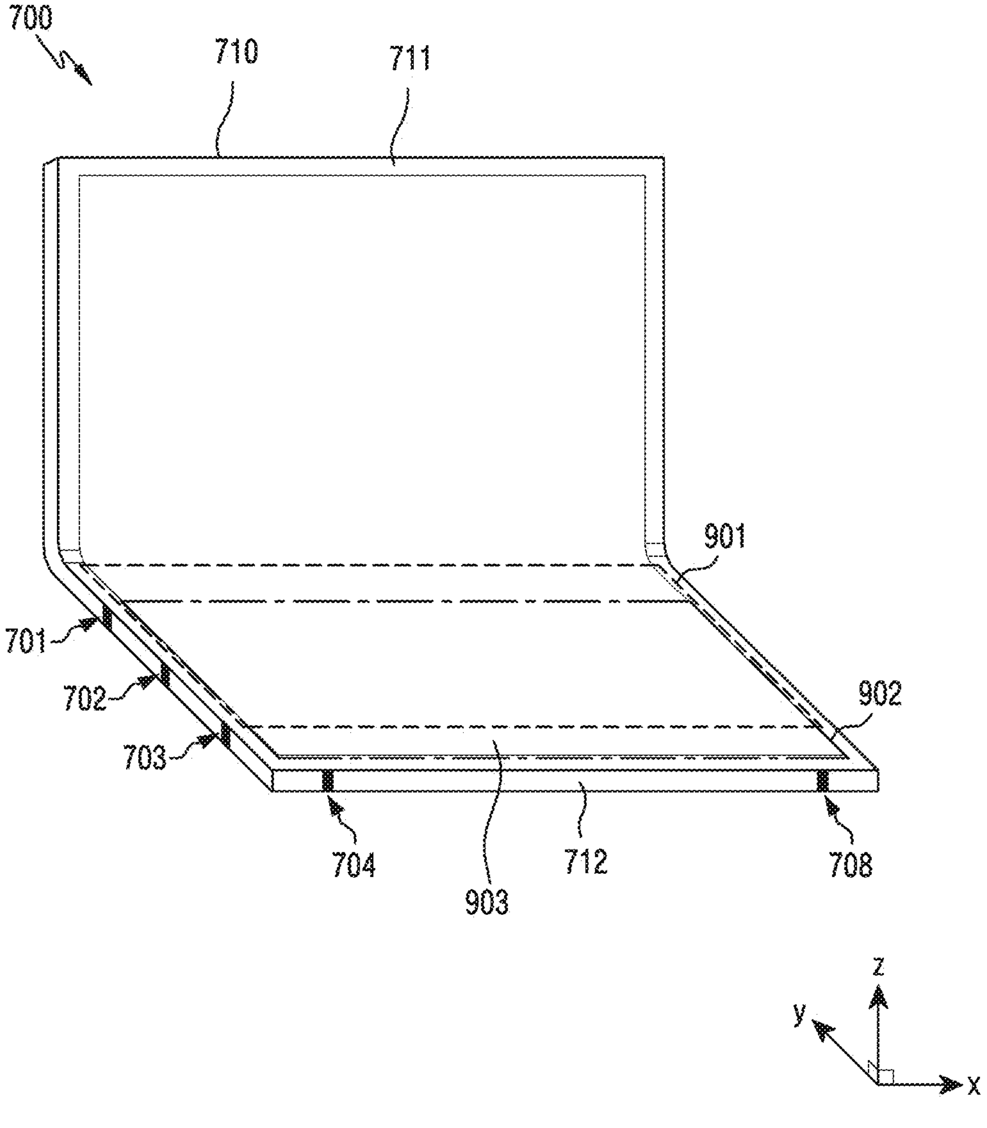
FIG. 8 is a perspective view illustrating a segmentation portion arranged in a portable electronic device according to various embodiments.

FIG. 7 is a diagram illustrating an antenna arrangement structure using a conductive member included in a portable electronic device according to various embodiments, and FIG. 8 is a perspective view illustrating a segmentation portion arranged in the portable electronic device according to various embodiments. In the following description, the portable electronic device may correspond to the external electronic device described in FIGS. 2, 3, 4, 5 and 6 (which may be referred to as FIGS. 2 to 6).

Referring to FIGS. 7 and 8, a portable electronic device 700 may include a housing 710. According to an embodiment, the housing 710 may form an exterior of the portable electronic device 700 and protect at least one surface of the portable electronic device 700 from external impact. The housing 710 may include a front surface, a rear surface, and a side surface portion 712*c*, 712*d* or 712*e* surrounding a portion of a space between the front surface and the rear surface. The side surface portion 712*c*, 712*d* or 712*e* may refer to a surface that is visually seen when looking at a thin surface of the portable electronic device 700. The front surface, an area excluding the side surface portion 712*c*, 712*d* or 712*e*, may refer to a surface where a screen output through a display is exposed to the outside. The rear surface may refer to a surface opposite to the front surface. In various embodiments, the rear surface and/or the side surface portion 712*c*, 712*d* or 712*e* may expose a portion of the screen of the display to the outside, but the front surface may be prepared and output the screen of the display through its most area unlike the rear surface and/or the side surface portion 712*c*, 712*d* or 712*e*.

The housing 710 may fix and support internal components of the portable electronic device 700. For example, the housing 710 may present a space in which the internal components of the portable electronic device 700 may be seated, and may fix and support the seated components.

According to an embodiment, the housing 710 may include a first part (or first housing part) 711 and a second part (or second housing part) 712 physically isolated from the first part 711. For example, the first part 711 may be connected to the second part 712 through a hinge structure 713, and the first part 711 and the second part 712 may be rotated by the hinge structure 713.

According to an embodiment, the portable electronic device 700 may include an antenna on the side surface portion 712*c*, 712*d* or 712*e* of the housing 710. For example, the portable electronic device 700 may include conductive members arranged along a portion of the side surface portion 712*c*, 712*d* or 712*e* of the housing 710 and a segmentation portion formed between the conductive members and electrically isolating the conductive members from each other, and may use at least one of the conductive members as an antenna radiator.

In an embodiment, a portion of the side surface portion 712*c*, 712*d* or 712*e* of the housing 710 may include a conductive member. According to an embodiment, at least one conductive member may be arranged along a portion of the side surface portion 712*c*, 712*d* or 712*e* of the second part 712 of the housing 710. For example, as disclosed in FIG. 7, a tenth conductive member 721, an eleventh conductive member 722, a twelfth conductive member 723, and/or a thirteenth conductive member 724 may be arranged along a portion of the first side surface portion 712*c* (e.g., left side surface portion or one end portion in a −x-axis direction with respect to a center point of the second part 712) of the second part 712 of the housing 710. In addition, a fifteenth conductive member 726, a sixteenth conductive member 727, a seventeenth conductive member 728, and/or an eighteenth conductive member 729 may be arranged along a portion of the second side surface portion 712*d* (e.g., right side surface portion or one end portion in a +x-axis direction with respect to the center point of the second part 712) of the second part 712 of the housing 710. In addition, a fourteenth conductive member 725 may be arranged along a portion of the third side surface portion 712*e* (e.g., lower side surface portion or one end portion in a −y-axis direction with respect to the center point of the second part 712) of the second part 712 of the housing 710. For example, the tenth conductive member 721 may be arranged at a first position (e.g., one end in the +y-axis direction) of the first side surface portion 712*c* of the second part 712. The eleventh conductive member 722 may be arranged at a second position of the first side surface portion 712*c* in the −y-axis direction of the tenth conductive member 721. The twelfth conductive member 723 may be arranged at a third position of the first side surface portion 712*c* in the −y-axis direction of the eleventh conductive member 722. The thirteenth conductive member 724 may be arranged at a fourth position of the first side surface portion 712*c* in the −y-axis direction of the twelfth conductive member 723. The fourteenth conductive member 725 may be arranged at a fifth position of the third side surface portion 712*e*. The fifteenth conductive member 726 may be arranged at a sixth position (e.g., one end in a +y-axis direction) of the second side surface portion 712*d* of the second part 712. The sixteenth conductive member 727 may be arranged at a seventh position of the second side surface portion 712*d* in the −y-axis direction of the fifteenth conductive member 726. The seventeenth conductive member 728 may be arranged at an eighth position of the second side surface portion 712*d* in the −y-axis direction of the sixteenth conductive member 727. The eighth conductive member 729 may be arranged at a ninth position of the second side surface portion 712*d* in the −y-axis direction of the seventeenth conductive member 728. However, the number and arrangement positions of the conductive members arranged along a portion of the side surface portion 712*c*, 712*d* or 712*e* of the second part 712 of the housing 710 are not limited thereto.

According to an embodiment, at least one segmentation portion 701, 702, 703, 704, 705, 706, 707 and 708 may be formed between the conductive members 721, 722, 723, 724, 725, 726, 727, 728 and 729 formed on a portion of the side surface portion 712*c*, 712*d* or 712*e* of the housing 710, and may electrically isolate the conductive members 721, 722, 723, 724, 725, 726, 727, 728 and 729 from each other. For example, as disclosed in FIGS. 7 and 8, the ninth segmentation portion 701 may be formed between the tenth conductive member 721 and the eleventh conductive member 722, and may electrically isolate the tenth conductive member 721 from the eleventh conductive member 722. The tenth segmentation portion 702 may be formed between the eleventh conductive member 722 and the twelfth conductive member 723, and may electrically isolate the eleventh conductive member 722 from the twelfth conductive member 723. The eleventh segmentation portion 703 may be formed between the twelfth conductive member 723 and the thirteenth conductive member 724, and may electrically isolate the twelfth conductive member 723 from the thirteenth conductive member 724. The twelfth segmentation portion 704 may be formed between the thirteenth conductive member 724 and the fourteenth conductive member 725, and may electrically isolate the thirteenth conductive member 724 from the fourteenth conductive member 725. The thirteenth segmentation portion 705 may be formed between the fifteenth conductive member 726 and the sixteenth conductive member 727, and may electrically isolate the fifteenth conductive member 726 from the sixteenth conductive member 727. The fourteenth segmentation portion 706 may be formed between the sixteenth conductive member 727 and the seventeenth conductive member 728, and may electrically isolate the sixteenth conductive member 727 from the seventeenth conductive member 728. The fifteenth segmentation portion 707 may be formed between the seventeenth conductive member 728 and the eighteenth conductive member 729, and may electrically isolate the seventeenth conductive member 728 from the eighteenth conductive member 729. The sixteenth segmentation portion 708 may be formed between the eighteenth conductive member 729 and the fourteenth conductive member 725, and may electrically isolate the eighteenth conductive member 729 from the fourteenth conductive member 725. However, the number of the segmentation portions is not limited thereto.

When the portable electronic device 700 is arranged to overlap (or is fastened to) an external electronic device (e.g., electronic device 200 of FIGS. 2 to 6), the at least one segmentation portion of the portable electronic device 700 may be arranged at a position aligned with a segmentation portion formed in a side surface portion of the external electronic device. When the portable electronic device 700 is arranged to overlap (or is fastened to) the external electronic device, the at least one segmentation portion of the portable electronic device 700 may be arranged at the position aligned with the segmentation portion formed in the side surface portion of the external electronic device and minimize and/or reduce the deterioration of the radiation performance of an antenna of the portable electronic device 700.

Figure 9:
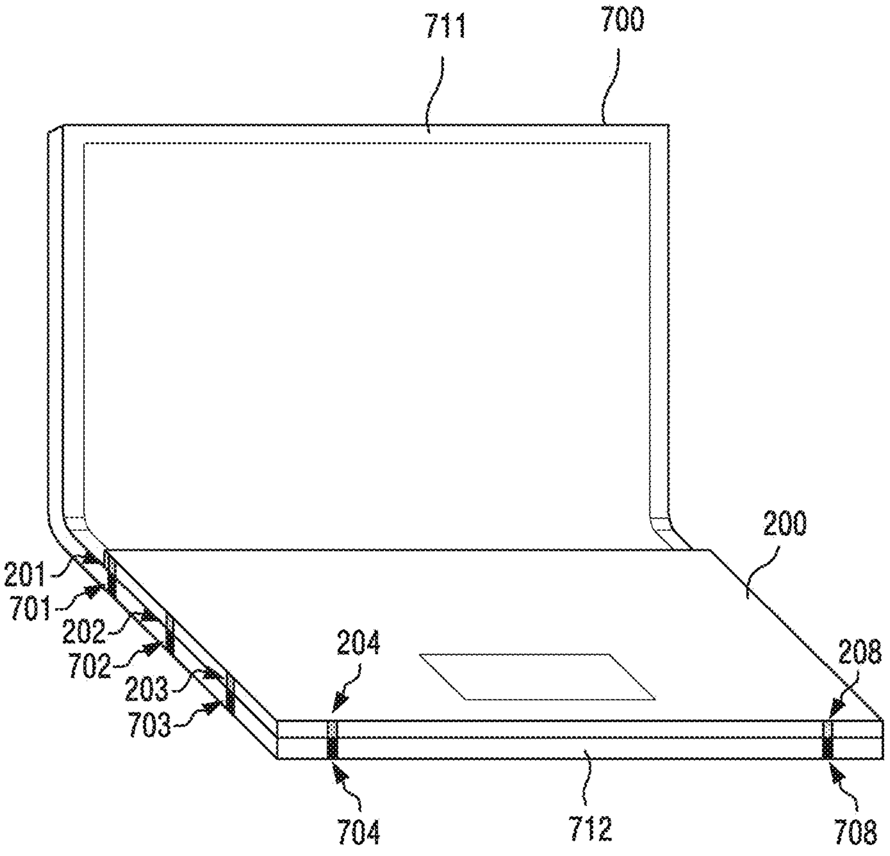
FIG. 9 is a perspective view illustrating a state in which an electronic device is fastened to a portable electronic device according to various embodiments.

FIG. 9 is a perspective view illustrating a state in which an electronic device is fastened to a portable electronic device according to various embodiments.

Referring to FIG. 9, depending on the usage environment of a portable electronic device 700, an electronic device 200 may be used spaced a certain distance apart from the portable electronic device 700, or may be used arranged to overlap (or fastened to) a partial area of the portable electronic device 700. For example, when the portable electronic device 700 operates in a desktop mode or a canvas mode, the electronic device 200 may be used spaced apart from the portable electronic device 700, and when the portable electronic device 700 operates in a laptop mode, as shown in FIG. 9, the electronic device 200 may be used arranged to overlap (or fastened to) a lower end portion of the portable electronic device 700.

According to an embodiment, when the electronic device 200 is arranged to overlap (or is fastened to) a partial area of the portable electronic device 700 (e.g., when the electronic device 200 is used placed on a lower end portion of the portable electronic device 700), a segmentation portion formed in a side surface portion of the electronic device 200 may be arranged at a position aligned with a segmentation portion arranged at a side surface portion of a housing 710 of the portable electronic device 700.

According to an embodiment, a conductive part and a segmentation portion included in the electronic device 200 may be arranged at a side surface portion of a housing 210 of the electronic device 200. In this case, when the electronic device 200 is arranged to overlap (or is fastened to) a partial area of the portable electronic device 700, a first segmentation portion 201 formed in the side surface portion of the housing 210 of the electronic device 200 may be arranged at a position aligned with a ninth segmentation portion 701 arranged at a side surface portion of a second part 712 of the portable electronic device 700. A second segmentation portion 202 formed in the side surface portion of the housing 210 of the electronic device 200 may be arranged at a position aligned with a tenth segmentation portion 702 arranged at the side surface portion of the second part 712 of the portable electronic device 700. A third segmentation portion 203 formed in the side surface portion of the housing 210 of the electronic device 200 may be arranged at a position aligned with an eleventh segmentation portion 703 arranged at the side surface portion of the second part 712 of the portable electronic device 700. A fourth segmentation portion 204 formed in the side surface portion of the housing 210 of the electronic device 200 may be arranged at a position aligned with a twelfth segmentation portion 704 arranged at the side surface portion of the second part 712 of the portable electronic device 700. A fifth segmentation portion 205 formed in the side surface portion of the housing 210 of the electronic device 200 may be arranged at a position aligned with a thirteenth segmentation portion 705 arranged at the side surface portion of the second part 712 of the portable electronic device 700. A sixth segmentation portion 206 formed in the side surface portion of the housing 210 of the electronic device 200 may be arranged at a position aligned with a fourteenth segmentation portion 706 arranged at the side surface portion of the second part 712 of the portable electronic device 700. A seventh segmentation portion 207 formed in the side surface portion of the housing 210 of the electronic device 200 may be arranged at a position aligned with a fifteenth segmentation portion 707 arranged at the side surface portion of the second part 712 of the portable electronic device 700. An eighth segmentation portion 208 formed in the side surface portion of the housing 210 of the electronic device 200 may be arranged at a position aligned with a sixteenth segmentation portion 708 arranged at the side surface portion of the second part 712 of the portable electronic device 700.

According to an embodiment, a conductive part and a segmentation portion included in the electronic device 200 may be arranged at a side surface portion of a plate 290 arranged inside the housing 210 of the electronic device 200. In this case, when the electronic device 200 is arranged to overlap (or is fastened to) a partial area of the portable electronic device 700, a first segmentation portion 291 formed in the side surface portion of the plate 290 of the electronic device 200 may be arranged at a position aligned with the ninth segmentation portion 701 arranged at the side surface portion of the second part 712 of the portable electronic device 700. A second segmentation portion 292 formed in the side surface portion of the plate 290 of the electronic device 200 may be arranged at a position aligned with the tenth segmentation portion 702 arranged at the side surface portion of the second part 712 of the portable electronic device 700. A third segmentation portion 293 formed in the side surface portion of the plate 290 of the electronic device 200 may be arranged at a position aligned with the eleventh segmentation portion 703 arranged at the side surface portion of the second part 712 of the portable electronic device 700. A fourth segmentation portion 294 formed in the side surface portion of the plate 290 of the electronic device 200 may be arranged at a position aligned with the twelfth segmentation portion 704 arranged at the side surface portion of the second part 712 of the portable electronic device 700. A fifth segmentation portion 295 formed in the side surface portion of the plate 290 of the electronic device 200 may be arranged at a position aligned with the thirteenth segmentation portion 705 arranged at the side surface portion of the second part 712 of the portable electronic device 700. A sixth segmentation portion 296 formed in the side surface portion of the plate 290 of the electronic device 200 may be arranged at a position aligned with the fourteenth segmentation portion 706 arranged at the side surface portion of the second part 712 of the portable electronic device 700. A seventh segmentation portion 297 formed in the side surface portion of the plate 290 of the electronic device 200 may be arranged at a position aligned with the fifteenth segmentation portion 707 arranged at the side surface portion of the second part 712 of the portable electronic device 700. An eighth segmentation portion 298 formed in the side surface portion of the plate 290 of the electronic device 200 may be arranged at a position aligned with the sixteenth segmentation portion 708 arranged at the side surface portion of the second part 712 of the portable electronic device 700.

Figure 10:
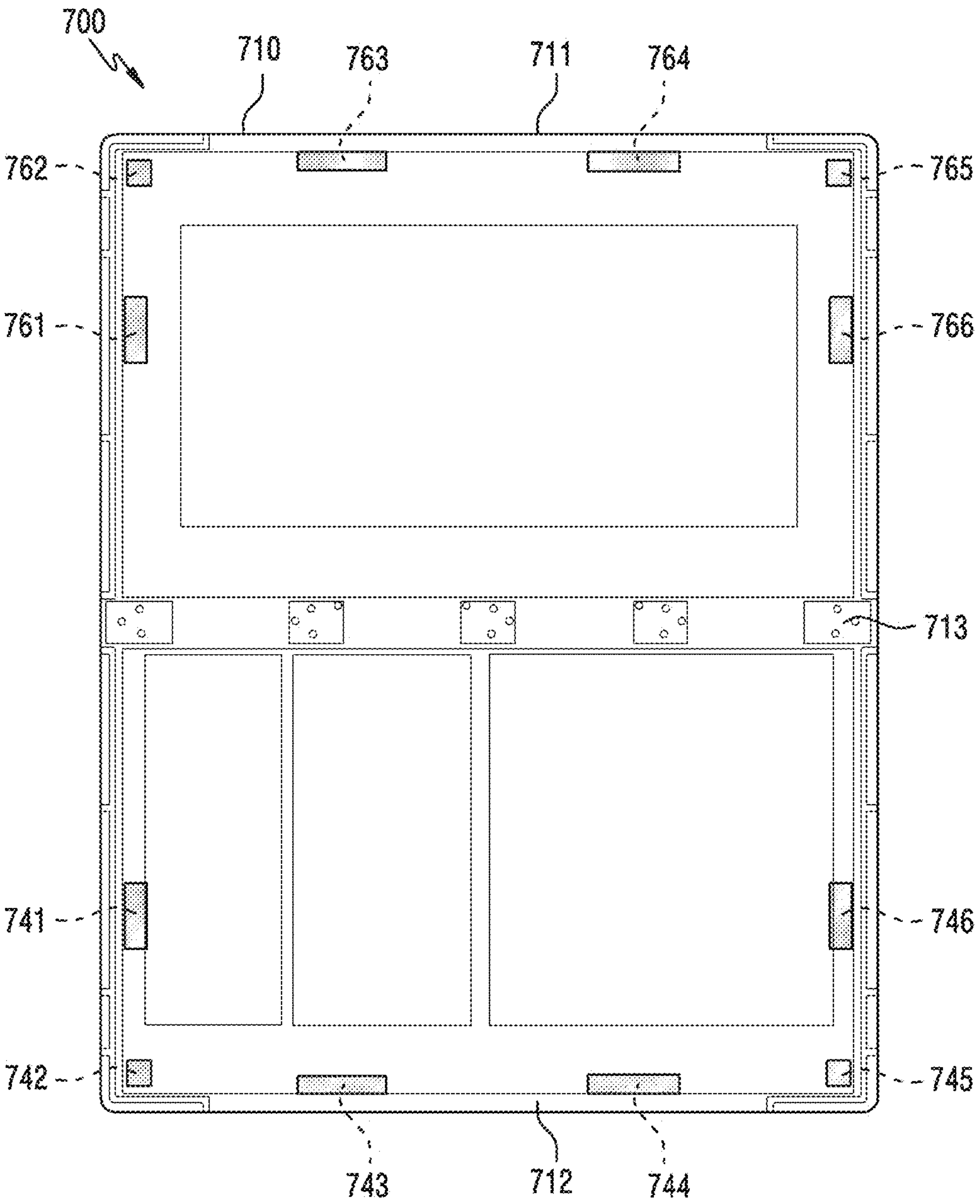
FIG. 10 is a diagram illustrating a fastening member arranged in a portable electronic device according to various embodiments.

FIG. 10 is a diagram illustrating a fastening member arranged in a portable electronic device according to various embodiments.

Referring to FIG. 10, a portable electronic device 700 may be folded or unfolded. For example, a housing 710 of the portable electronic device 700 may be folded or unfolded by a hinge structure 713. For example, when the portable electronic device 700 is fully unfolded, a first part 711 and a second part 712 of the housing 710 may be in a state of forming substantially the same plane. For example, when the portable electronic device 700 is fully folded, the first part 711 and the second part 712 of the housing 710 may be in a state of facing each other. For example, when the portable electronic device 700 is unfolded at a specified angle, the first part 711 and the second part 712 of the housing 710 may be in a state of forming the specified angle. For example, the specified angle includes an angle formed by the first part 711 and the second part 712 moving by the hinge structure 713, and may include an angle between about 0 degrees and about 180 degrees.

According to an embodiment, at least one fastening member may be arranged at edges of the first part 711 and the second part 712 of the housing 710 of the portable electronic device 700 and may maintain the portable electronic device 700 in a fully folded state. For example, when the portable electronic device 700 is in a fully folded state, a fastening member arranged at the first part 711 of the housing 710 of the portable electronic device 700 may be arranged at a position aligned with a fastening member arranged at the second part 712 of the housing 710 of the portable electronic device 700. For example, a first fastening member 761 may be arranged at a left edge of the first part 711. A second fastening member 762 may be arranged at an upper left corner of the first part 711. A third fastening member 763 may be arranged at a left side of an upper edge of the first part 711. A fourth fastening member 764 may be arranged at a right side of the upper edge of the first part 711. A fifth fastening member 765 may be arranged at an upper right corner of the first part 711. A sixth fastening member 766 may be arranged at a right edge of the first part 711. In addition, a seventh fastening member 741 may be arranged at a left edge of the second part 712. An eighth fastening member 742 may be arranged at a lower left corner of the second part 712. A ninth fastening member 743 may be arranged at a left side of a lower edge of the second part 712. A tenth fastening member 744 may be arranged at a right side of the lower edge of the second part 712. An eleventh fastening member 745 may be arranged at a lower right corner of the second part 712. A twelfth fastening member 746 may be arranged at a right edge of the second part 712. In this case, when the portable electronic device 700 is in a fully folded state, the first fastening member 761 arranged at the first part 711 may be aligned with and fastened to the seventh fastening member 741 arranged at the second part 712. The second fastening member 762 arranged at the first part 711 may be aligned with and fastened to the eighth fastening member 742 arranged at the second part 712. The third fastening member 763 arranged at the first part 711 may be aligned with and fastened to the ninth fastening member 743 arranged at the second part 712. The fourth fastening member 764 arranged at the first part 711 may be aligned with and fastened to the tenth fastening member 744 arranged at the second part 712. The fifth fastening member 765 arranged at the first part 711 may be aligned with and fastened to the eleventh fastening member 745 arranged at the second part 712. The sixth fastening member 766 arranged at the first part 711 may be aligned with and fastened to the twelfth fastening member 746 arranged at the second part 712.

According to an embodiment, the at least one fastening member 741, 742, 743, 744, 745, 746, 761, 762, 763, 764, 765 or 766 may include a magnet.

Figure 11:
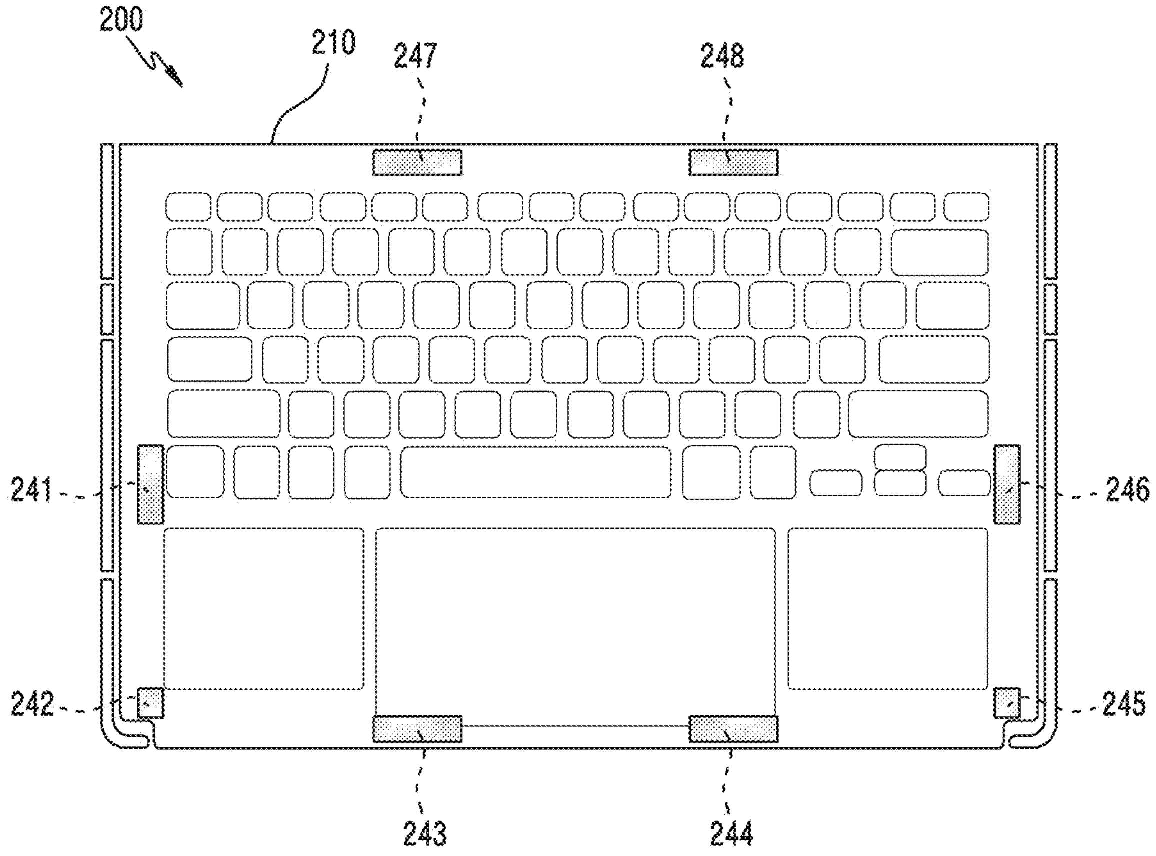
FIG. 11 is a diagram illustrating a fastening member arranged in an electronic device according to various embodiments.

FIG. 11 is a diagram illustrating a fastening member arranged in an electronic device according to various embodiments.

Referring to FIG. 11, an electronic device 200 may include at least one fastening member for increasing a fastening force with a portable electronic device 700 and fastening to a specified position of the portable electronic device 700, when the electronic device 200 is fastened to the portable electronic device 700. When the electronic device 200 is fastened to the portable electronic device 700, a fastening member arranged in the electronic device 200 may be arranged at a position aligned with a fastening member arranged in the portable electronic device 700. For example, a thirteenth fastening member 241 may be arranged at a left edge of a housing 210 of the electronic device 200. A fourteenth fastening member 242 may be arranged at a lower left corner of the housing 210 of the electronic device 200. A fifteenth fastening member 243 may be arranged at a left side of a lower edge of the housing 210 of the electronic device 200. A sixteenth fastening member 244 may be arranged at a right side of the lower edge of the housing 210 of the electronic device 200. A seventeenth fastening member 245 may be arranged at a lower right corner of the housing 210 of the electronic device 200. An eighteenth fastening member 246 may be arranged at a right edge of the housing 210 of the electronic device 200. In this case, when the electronic device 200 is fastened to the portable electronic device 700, the thirteenth fastening member 241 arranged at the housing 210 of the electronic device 200 may be aligned with and fastened to a seventh fastening member 741 arranged at a second part 712 of the portable electronic device 700. The fourteenth fastening member 242 arranged at the housing 210 of the electronic device 200 may be aligned with and fastened to an eighth fastening member 742 arranged at the second part 712 of the portable electronic device 700. The fifteenth fastening member 243 arranged at the housing 210 of the electronic device 200 may be aligned with and fastened to a ninth fastening member 743 arranged at the second part 712 of the portable electronic device 700. The sixteenth fastening member 244 arranged at the housing 210 of the electronic device 200 may be aligned with and fastened to a tenth fastening member 744 arranged at the second part 712 of the portable electronic device 700. The seventeenth fastening member 245 arranged at the housing 210 of the electronic device 200 may be aligned with and fastened to an eleventh fastening member 745 arranged at the second part 712 of the portable electronic device 700. The eighteenth fastening member 246 arranged at the housing 210 of the electronic device 200 may be aligned with and fastened to a twelfth fastening member 746 arranged at the second part 712 of the portable electronic device 700.

According to an embodiment, depending on the usage environment of the portable electronic device 700, the electronic device 200 may further include at least one of a nineteenth fastening member 247 and a twentieth fastening member 248 and support various types of fastening. For example, based on FIG. 11, the nineteenth fastening member 247 may be arranged at a left side of an upper edge of the housing 210 of the electronic device 200. In addition, based on FIG. 11, the twentieth fastening member 248 may be arranged at a right side of the upper edge of the housing 210 of the electronic device 200. The nineteenth fastening member 247 may be aligned with and fastened to the ninth fastening member 743 arranged at the second part 712 of the portable electronic device 700. In addition, the twentieth fastening member 248 may be aligned with and fastened to the tenth fastening member 744 arranged at the second part 712 of the portable electronic device 700.

According to an embodiment, the at least one fastening member 241, 242, 243, 244, 245, 246, 247 or 248 may include a magnet.

Figure 12:
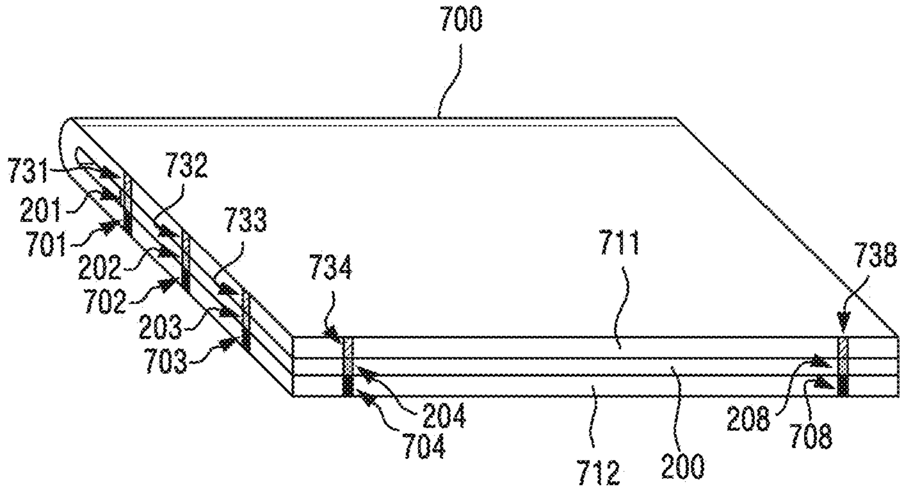
FIG. 12 is a perspective view illustrating a state in which an electronic device is fastened to a foldable electronic device in a folded state of the foldable electronic device when a portable electronic device is the foldable electronic device according to various embodiments.

FIG. 12 is a perspective view illustrating a state in which an electronic device is fastened to a foldable electronic device in a folded state of the foldable electronic device when a portable electronic device is the foldable electronic device according to various embodiments.

Referring to FIG. 12, a portable electronic device 700 may be a foldable electronic device that may be folded or unfolded. For example, a housing 710 of the portable electronic device 700 may be folded or unfolded by a hinge structure 713. FIG. 12 shows a state in which the portable electronic device 700 is fully folded, and in this case, a first part 711 and a second part 712 of the housing 710 may be in a state of facing each other.

According to an embodiment, in order to prevent and/or reduce the radiation performance of an antenna arranged at a side surface portion of the housing 710 from being deteriorated even when the portable electronic device 700 is fully folded, at least one segmentation portion may be formed not only in the second part 712 of the housing 710 but also in the first part 711. For example, a seventeenth segmentation portion 731, an eighteenth segmentation portion 732, and a nineteenth segmentation portion 733 may be formed at a left edge of the second part 712. A twentieth segmentation portion 734 may be formed at a left side of an upper edge of the second part 712. A twenty-first segmentation portion (not shown), a twenty-second segmentation portion (not shown), and a twenty-third segmentation portion (not shown) may be formed at a right edge of the second part 712. A twenty-fourth segmentation portion 738 may be formed at a right side of the upper edge of the second part 712. In this case, when the portable electronic device 700 is in a fully folded state, the seventeenth segmentation portion 731 formed in the second part 712 may be arranged at a position aligned with a ninth segmentation portion 701 formed in the first part 711. The eighteenth segmentation portion 732 formed in the second part 712 may be arranged at a position aligned with a tenth segmentation portion 702 formed in the first part 711. The nineteenth segmentation portion 733 formed in the second part 712 may be arranged at a position aligned with an eleventh segmentation portion 703 formed in the first part 711. The twentieth segmentation portion 734 formed in the second part 712 may be arranged at a position aligned with a twelfth segmentation portion 704 formed in the first part 711. The twenty-first segmentation portion (not shown) formed in the second part 712 may be arranged at a position aligned with a thirteenth segmentation portion 705 formed in the first part 711. The twenty-second segmentation portion (not shown) formed in the second part 712 may be arranged at a position aligned with a fourteenth segmentation portion 706 formed in the first part 711. The twenty-third segmentation portion (not shown) formed in the second part 712 may be arranged at a position aligned with a fifteenth segmentation portion 707 formed in the first part 711. The twenty-fourth segmentation portion 738 formed in the second part 712 may be arranged at a position aligned with a sixteenth segmentation portion 708 formed in the first part 711.

According to an embodiment, when the portable electronic device 700 is fully folded in a state where the electronic device 200 is fastened to the portable electronic device 700, not only the segmentation portions formed in the first part 711 and the second part 712 of the housing 710 of the portable electronic device 700 but also segmentation portions formed in the electronic device 200 may be aligned with each other. For example, when the portable electronic device 700 is fully folded in a state where the electronic device 200 is fastened to the portable electronic device 700, a first segmentation portion 201 formed in a side surface portion of the electronic device 200, the ninth segmentation portion 701 formed in a side surface portion of the first part 711 of the portable electronic device 710, and the seventeenth segmentation portion 731 formed in a side surface portion of the second part 712 of the portable electronic device 710 may be aligned with each other. A second segmentation portion 202 formed in the side surface portion of the electronic device 200, the tenth segmentation portion 702 formed in the side surface portion of the first part 711 of the portable electronic device 710, and the eighteenth segmentation portion 732 formed in the side surface portion of the second part 712 of the portable electronic device 710 may be aligned with each other. A third segmentation portion 203 formed in the side surface portion of the electronic device 200, the eleventh segmentation portion 703 formed in the side surface portion of the first part 711 of the portable electronic device 710, and the nineteenth segmentation portion 733 formed in the side surface portion of the second part 712 of the portable electronic device 710 may be aligned with each other. A fourth segmentation portion 204 formed in the side surface portion of the electronic device 200, the twelfth segmentation portion 704 formed in the side surface portion of the first part 711 of the portable electronic device 710, and the twentieth segmentation portion 734 formed in the side surface portion of the second part 712 of the portable electronic device 710 may be aligned with each other. A fifth segmentation portion 205 formed in the side surface portion of the electronic device 200, the thirteenth segmentation portion 705 formed in the side surface portion of the first part 711 of the portable electronic device 710, and the twenty-first segmentation portion (not shown) formed in the side surface portion of the second part 712 of the portable electronic device 710 may be aligned with each other. A sixth segmentation portion 206 formed in the side surface portion of the electronic device 200, the fourteenth segmentation portion 706 formed in the side surface portion of the first part 711 of the portable electronic device 710, and the twenty-second segmentation portion (not shown) formed in the side surface portion of the second part 712 of the portable electronic device 710 may be aligned with each other. A seventh segmentation portion 207 formed in the side surface portion of the electronic device 200, the fifteenth segmentation portion 707 formed in the side surface portion of the first part 711 of the portable electronic device 710, and the twenty-third segmentation portion (not shown) formed in the side surface portion of the second part 712 of the portable electronic device 710 may be aligned with each other. An eighth segmentation portion 208 formed in the side surface portion of the electronic device 200, the sixteenth segmentation portion 708 formed in the side surface portion of the first part 711 of the portable electronic device 710, and the twenty-fourth segmentation portion 738 formed in the side surface portion of the second part 712 of the portable electronic device 710 may be aligned with each other.

Figure 13:
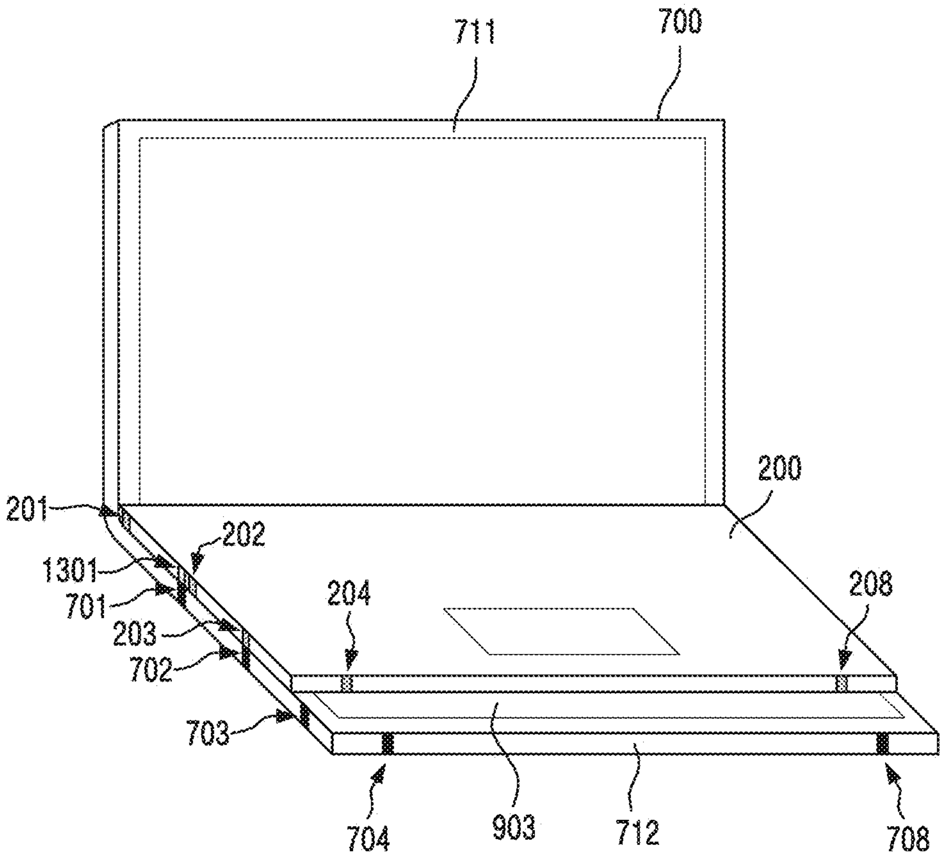
FIG. 13 is a perspective view illustrating another state in which an electronic device is fastened to a portable electronic device according to various embodiments.

FIG. 13 is a perspective view illustrating another state in which an electronic device is fastened to a portable electronic device according to various embodiments.

Referring to FIG. 13, an electronic device 200 may be fastened to a portable electronic device 700 in various forms, depending on the usage environment of the portable electronic device 700. FIG. 9 may illustrate a case where the electronic device 200 is fastened to a first area (e.g., first area 901 of FIG. 8) on a lower end portion (e.g., second part 712 of a housing 710) of the portable electronic device 700, and FIG. 13 may illustrate a case where the electronic device 200 is fastened to a second area (e.g., second area 902 of FIG. 8) on the lower end portion (e.g., second part 712 of the housing 710) of the portable electronic device 700. As shown in FIG. 13, when the electronic device 200 is fastened to the second area on the second part 712 of the portable electronic device 700, a portion (e.g., third area 903) of the first area on the second part 712 of the portable electronic device 700 may be exposed to the outside, and the exposed portion (e.g., third area 903) of the first area may be used as an additional touch area.

According to an embodiment, the electronic device 200 may include at least one additional segmentation portion that may be aligned with segmentation portions formed in a side surface portion of the second part 712, when the electronic device 200 is fastened to the second area on the second part 712 of the portable electronic device 700. For example, a twenty-fifth segmentation portion 1301 and a twenty-sixth segmentation portion (not shown) may be formed in a side surface portion of the electronic device 200. When the electronic device 200 is fastened to the second area on the second part 712 of the portable electronic device 700, the twenty-fifth segmentation portion 1301 may be arranged at a position aligned with a ninth segmentation portion 701 formed in the side surface portion of the second part 712 of the portable electronic device 700, and the twenty-sixth segmentation portion (not shown) may be arranged at a position aligned with a thirteenth segmentation portion 705 formed in the side surface portion of the second part 712 of the portable electronic device 700. For example, a ninth segmentation portion 701 formed in the side surface portion of the second part 712 of the portable electronic device 700 may be aligned with a first segmentation portion 201 formed in the side surface portion of the electronic device 200 when the electronic device 200 is fastened to the first area on the second part 712 of the portable electronic device 700, and may be aligned with the twenty-fifth segmentation portion 1301 formed in the side surface portion of the electronic device 200 when the electronic device 200 is fastened to the second area on the second part 712 of the portable electronic device 700. For example, a thirteenth segmentation portion 705 formed in the side surface portion of the second part 712 of the portable electronic device 700 may be aligned with a fifth segmentation portion 205 formed in the side surface portion of the electronic device 200 when the electronic device 200 is fastened to the first area on the second part 712 of the portable electronic device 700, and may be aligned with the twenty-sixth segmentation portion (not shown) formed in the side surface portion of the electronic device 200 when the electronic device 200 is fastened to the second area on the second part 712 of the portable electronic device 700. However, the number and arrangement positions of the additional segmentation portions formed in the side surface portion of the electronic device 200 are not limited thereto.

Figure 14:
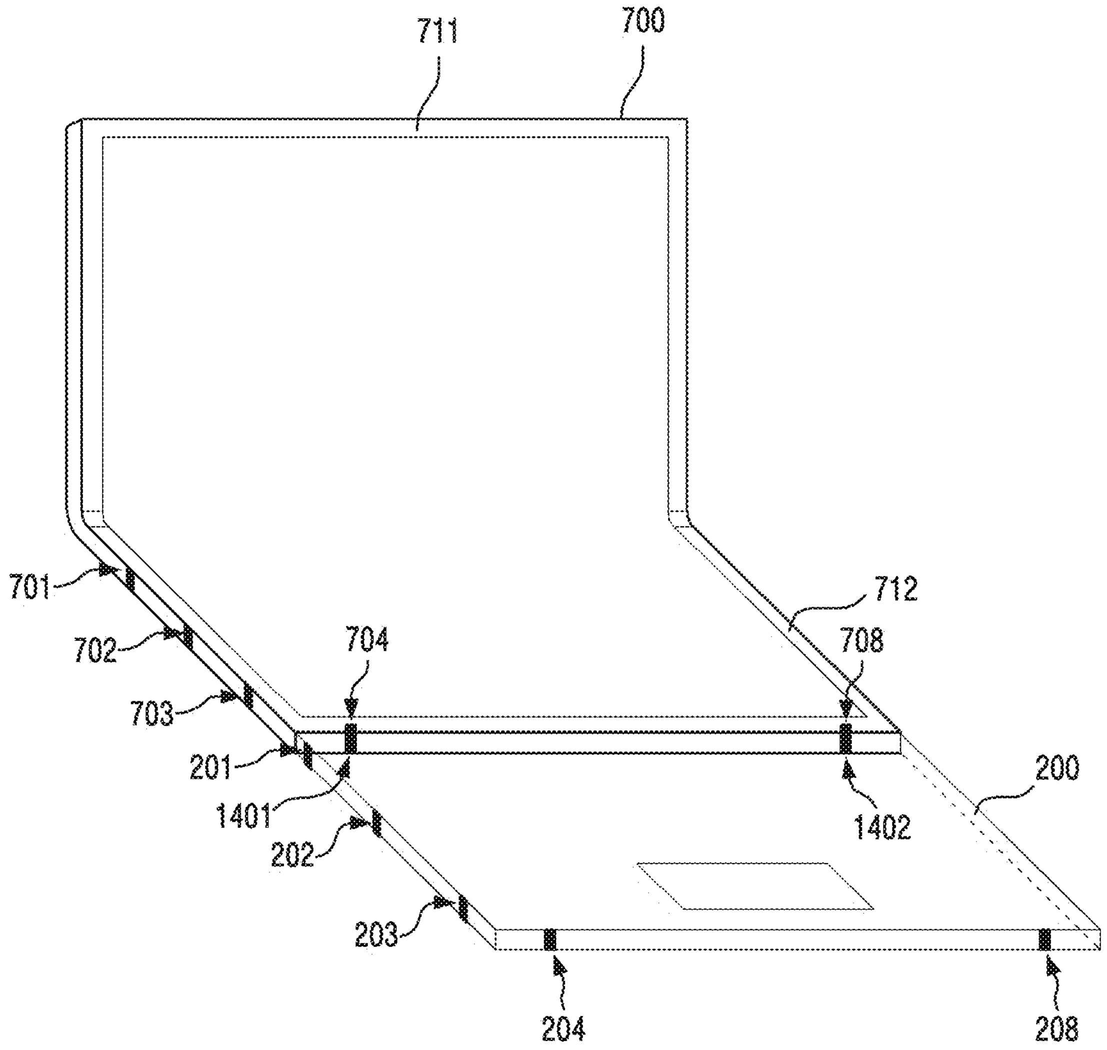
FIG. 14 is a perspective view illustrating a further state in which an electronic device is fastened to a portable electronic device according to various embodiments.

FIG. 14 is a perspective view illustrating a further state in which an electronic device is fastened to a portable electronic device according to various embodiments.

Referring to FIG. 14, an electronic device 200 may be fastened to a portable electronic device 700 in various forms, depending on the usage environment of the portable electronic device 700. FIG. 9 may illustrate a case where the electronic device 200 is fastened to a first area (e.g., first area 901 of FIG. 8) on a lower end portion (e.g., second part 712 of a housing 710) of the portable electronic device 700, FIG. 13 may illustrate a case where the electronic device 200 is fastened to a second area (e.g., second area 902 of FIG. 8) on the lower end portion (e.g., second part 712 of the housing 710) of the portable electronic device 700, and FIG. 14 may illustrate a case where the electronic device 200 is fastened to a lower side surface (e.g., third side surface portion 712*e* of FIG. 7) of the lower end portion (e.g., second part 712 of the housing 710) of the portable electronic device 700.

According to an embodiment, the electronic device 200 may include at least one segmentation portion that may be aligned with segmentation portions formed in a side surface portion of a second part 712 when the electronic device 200 is fastened to a lower side surface of the second part 712 of the portable electronic device 700. For example, a twenty-seventh segmentation portion 1401 and a twenty-eighth segmentation portion 1402 may be formed in a side surface portion of the electronic device 200. When the electronic device 200 is fastened to the lower side surface of the second part 712 of the portable electronic device 700, the twenty-seventh segmentation portion 1401 may be arranged at a position aligned with a twelfth segmentation portion 704 formed in the side surface portion of the second part 712 of the portable electronic device 700, and the twenty-eighth segmentation portion 1402 may be arranged at a position aligned with a sixteenth segmentation portion 708 formed in the side surface portion of the second part 712 of the portable electronic device 700. However, the number and arrangement positions of the additional segmentation portions formed at an edge of the electronic device 200 are not limited thereto.

Figure 15:
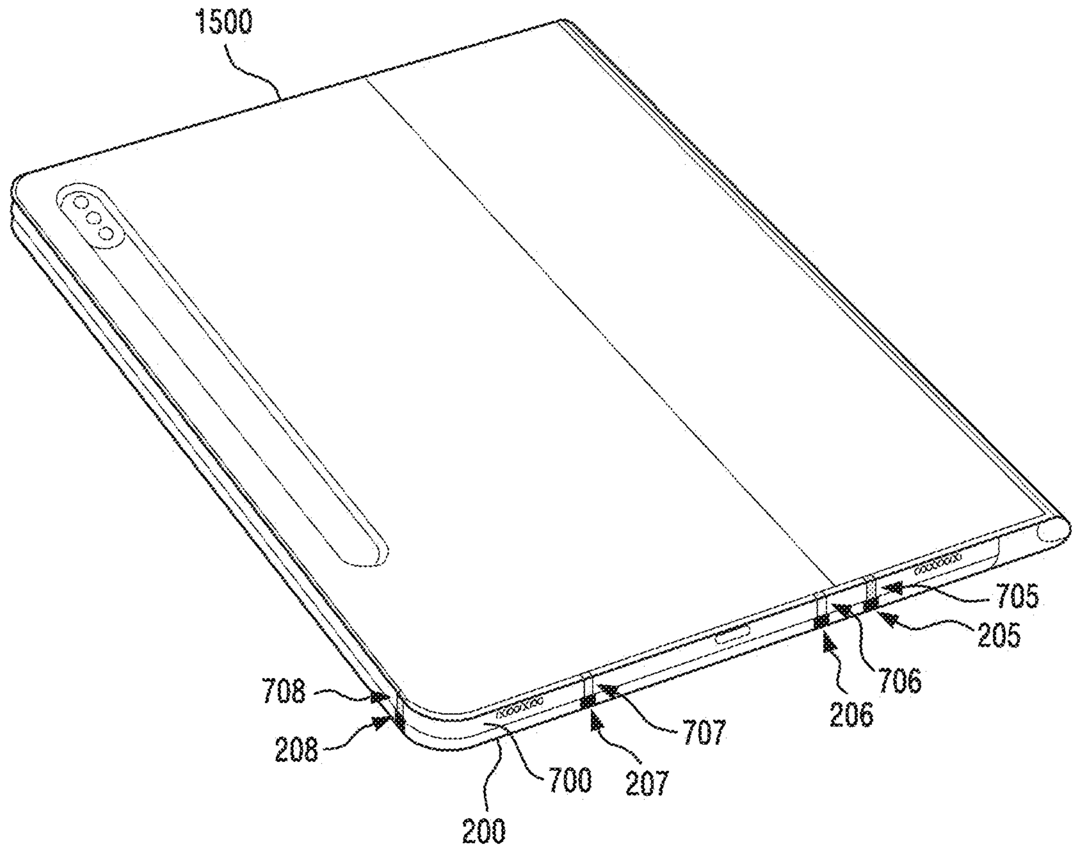
FIG. 15 is a perspective view illustrating a state in which an electronic device and a portable electronic device are stored in a cover according to various embodiments.

FIG. 15 is a perspective view illustrating a state where an electronic device and a portable electronic device are stored in a cover according to various embodiments.

Referring to FIG. 15, a portable electronic device 700 and an electronic device 200 arranged to overlap (or be fastened to) the portable electronic device 700 may be stored in a cover 1500. Even when the portable electronic device 700 and the electronic device 200 are stored in the cover 1500, a segmentation portion arranged at a side surface portion of the electronic device 200 may be arranged at a position aligned with a segmentation portion arranged at a side surface portion of a housing 710 of the portable electronic device 700. For example, as illustrated in FIG. 15, in a state where the portable electronic device 700 and the electronic device 200 are stored in the cover 1500, a fifth segmentation portion 205 arranged at the side surface portion of the electronic device 200 may be aligned with a thirteenth segmentation portion 705 arranged at the side surface portion of the housing 710 of the portable electronic device 700. A sixth segmentation portion 206 arranged at the side surface portion of the electronic device 200 may be aligned with a fourteenth segmentation portion 706 arranged at the side surface portion of the housing 710 of the portable electronic device 700. A seventh segmentation portion 207 arranged at the side surface portion of the electronic device 200 may be aligned with a fifteenth segmentation portion 707 arranged at the side surface portion of the housing 710 of the portable electronic device 700. An eighth segmentation portion 208 arranged at the side surface portion of the electronic device 200 may be aligned with a sixteenth segmentation portion 708 arranged at the side surface portion of the housing 710 of the portable electronic device 700.

Figure 16:
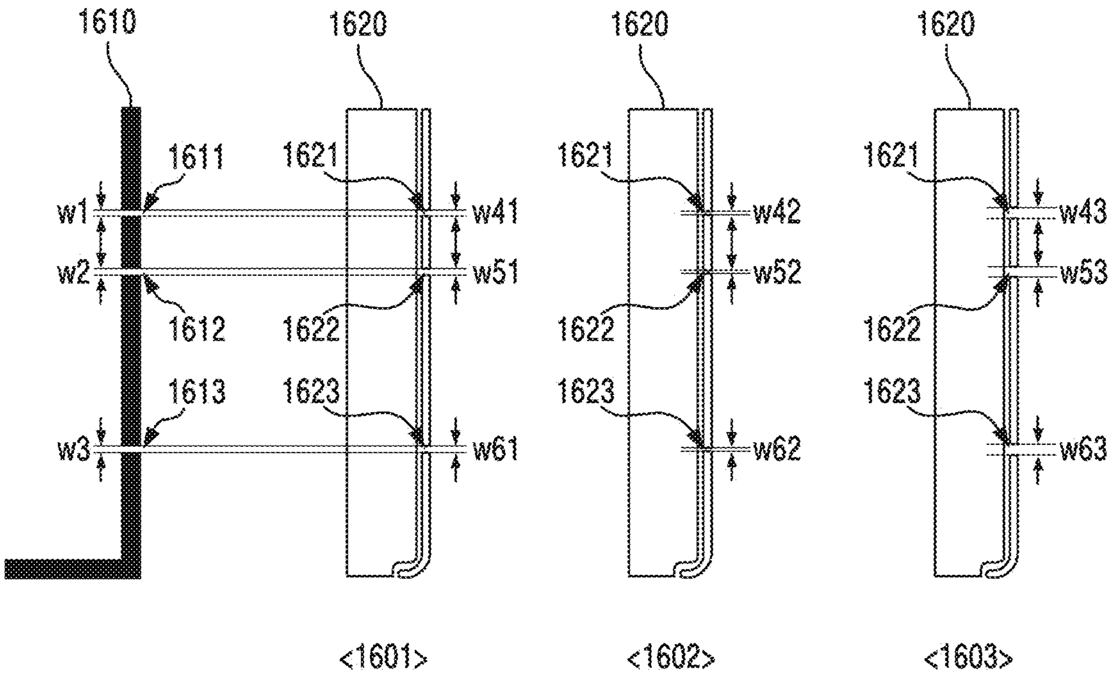
FIG. 16 is a diagram illustrating the segmentation widths of segmentation portions of an electronic device and a portable electronic device according to various embodiments.

FIG. 16 is a diagram illustrating various segmentation widths of segmentation portions of an electronic device and a portable electronic device according to various embodiments.

Referring to FIG. 16, the width of a segmentation portions 1621, 1622 or 1623 (e.g., segmentation portion 201, 202, 203, 204, 205, 206, 207 or 208 of FIG. 2 or segmentation portion 291, 292, 293, 294, 295, 296, 297 or 298 of FIG. 5) arranged at a side surface portion of an electronic device 1620 (e.g., electronic device 200) may be variously set according to the characteristics of an antenna arranged at a side surface portion of a housing of a portable electronic device 1610 (e.g., portable electronic device 700). Since a capacitance between metal segmentations of the antenna is a factor affecting the characteristics of the antenna, a segmentation coefficient may be calculated based on a segmentation width, and the characteristics of the antenna may be tuned according to the segmentation coefficient. For example, when the segmentation width decreases, the segmentation coefficient may increase, and when the segmentation coefficient increases, a resonant frequency of the antenna may low-shift. For example, by decreasing the segmentation width, a low resonant frequency may be secured while the volume of a radiator (conductive member) of the antenna is maintained.

In an example, as in a first state 1601, a first width w41, w51 or w61 of the segmentation portion 1621, 1622 or 1623 arranged at the side surface portion of the electronic device 1620 may be equal to a width w1, w2 or w3 of a segmentation portion 1611, 1612 or 1613 arranged at the side surface portion of the housing of the portable electronic device 1610. In another example, as in a second state 1602, a second width w42, w52 or w62 of the segmentation portion 1621, 1622 or 1623 arranged at the side surface portion of the electronic device 1620 may be less than the width w1, w2 or w3 of the segmentation portion 1611, 1612 or 1613 arranged at the side surface portion of the housing of the portable electronic device 1610. In a further example, as in a third state 1603, a third width w43, w53 or w63 of the segmentation portion 1621, 1622 or 1623 arranged at the side surface portion of the electronic device 1620 may be greater than the width w1, w2 or w3 of the segmentation portion 1611, 1612 or 1613 arranged at the side surface portion of the housing of the portable electronic device 1610.

Figure 17:
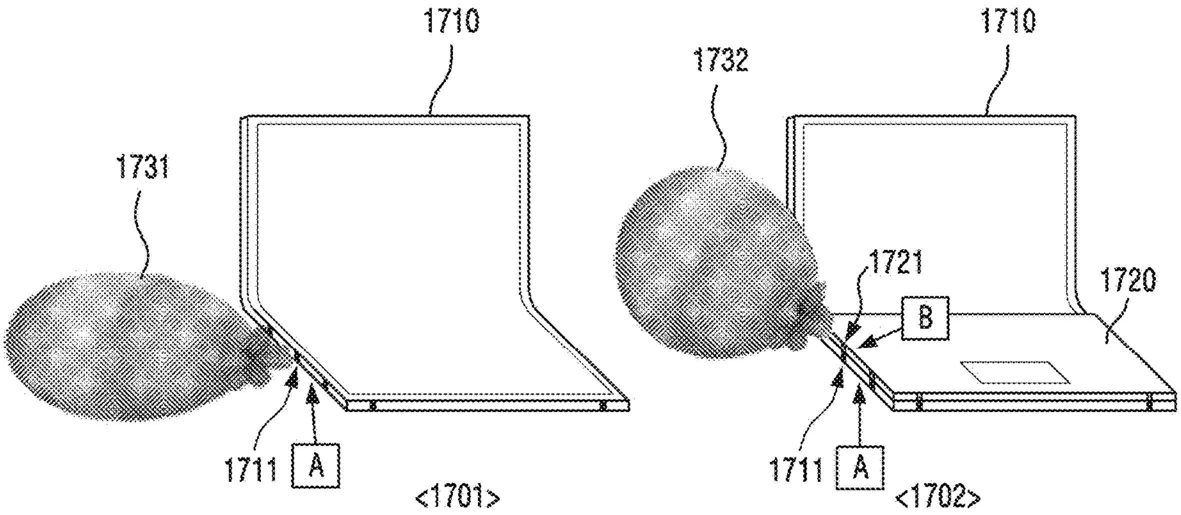
FIG. 17 includes perspective views illustrating a radiation pattern when an electronic device is arranged to overlap (or is fastened to) a portable electronic device according to various embodiments.

FIG. 17 includes perspective view illustrating various radiation patterns in a state where an electronic device is arranged to overlap (or is fastened to) a portable electronic device according to various embodiments.

Referring to FIG. 17, an electronic device 1720 (e.g., electronic device 200) may be arranged to overlap (or be fastened to) a portable electronic device 1710 (e.g., portable electronic device 700). For example, the electronic device 1720 may be arranged to overlap (or be fastened to) a lower end portion (e.g., second part 712 of a housing 710) of the portable electronic device 1710. In this case, a segmentation portion 1721 (e.g., segmentation portions 201 to 208, and 291 to 298) arranged at a side surface portion of the electronic device 1720 may be aligned with a segmentation portion 1711 (e.g., segmentation portions 701 to 708) arranged at a side surface portion of a housing of the portable electronic device 1710. In this case, when the segmentation portion 1721 arranged at the side surface portion of the electronic device 1720 is aligned with the segmentation portion 1711 arranged at the side surface portion of the housing of the portable electronic device 1710, a radiation pattern 1732 of an antenna of the portable electronic device 1710 may be changed in an upper direction. A first state 1701 of FIG. 17 represents a radiation pattern 1731 of the antenna (e.g., A of FIG. 17) of the portable electronic device 1710 when the electronic device 1720 is not arranged to overlap (or is not fastened to) the portable electronic device 1710, and a second state 1702 of FIG. 17 represents a radiation pattern 1732 of the antenna (e.g., A of FIG. 17) of the portable electronic device 1710 when the electronic device 1720 is arranged to overlap (or is fastened to) the portable electronic device 1710, for example, when the segmentation portion 1721 arranged at the side surface portion of the electronic device 1720 is aligned with the segmentation portion 1711 arranged at the side surface portion of the housing of the portable electronic device 1710. As in the second state 1702 of FIG. 17, when the segmentation portion 1721 of the electronic device 1720 is aligned with the segmentation portion 1711 of the portable electronic device 1710, coupling may occur due to a conductive part (e.g., B of FIG. 17) of the electronic device 1720 arranged adjacent to the antenna (e.g., A of FIG. 17) of the portable electronic device 1710, and as a result, a radiation area of the antenna (e.g., A of FIG. 17) of the portable electronic device 1710 may be expanded and the radiation pattern 1732 may be changed in the direction of the electronic device 1720, for example, in the upper direction. Considering that most mobile network base stations or WiFi access points (APs) are arranged at high places such as on a building ceiling or rooftop, the improvement of communication performance may be expected, when the radiation pattern 1732 of the antenna is changed in the upper direction as in the second state 1702 of FIG. 17.

Figure 18:
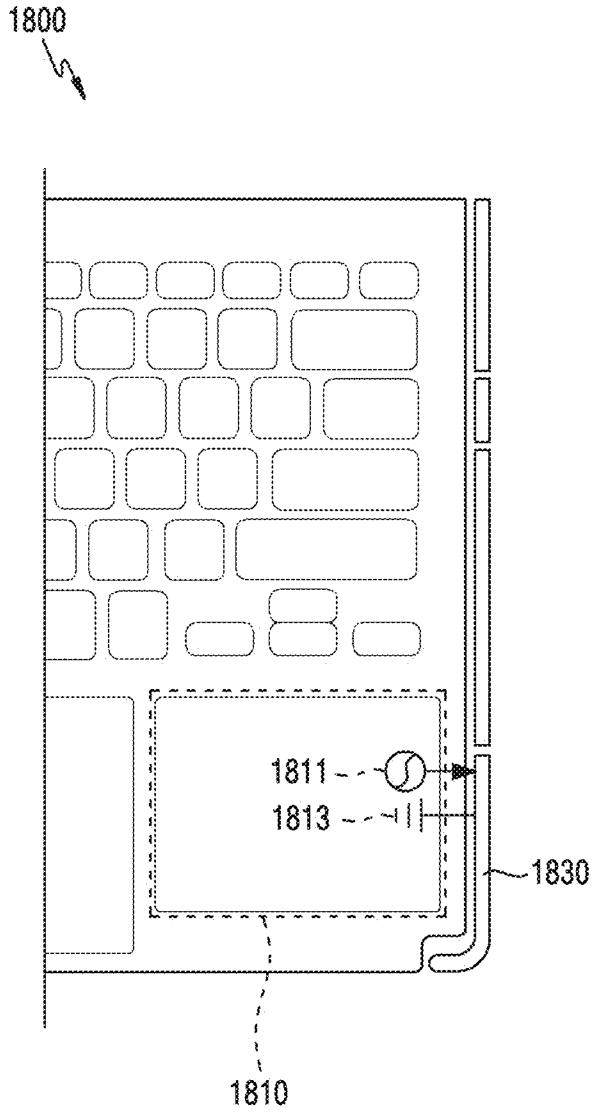
FIG. 18 is a diagram illustrating an example method of using, as an antenna, a conductive part included in an electronic device according to various embodiments.

FIG. 18 is a diagram illustrating an example method of using, as an antenna, a conductive part included in an electronic device according to various embodiments.

Referring to FIG. 18, at least one conductive part 1830 (e.g., conductive member 221 to 229) arranged at a side surface portion of an electronic device 1800 (e.g., electronic device 200) may be used as an antenna radiator. The at least one conductive part 1830 may be connected to a feeder unit (or feeder circuit) 1811 and a ground unit 1813 that are prepared in a printed circuit board 1810 (e.g., printed circuit board 250), and may operate as an antenna radiator that is fed by the feeder unit 1811 and forms resonance. According to an embodiment, the at least one conductive part 1830 may operate as an antenna radiator for connecting to a portable electronic device 700 by wireless communication (e.g., Bluetooth communication).

Figure 19:
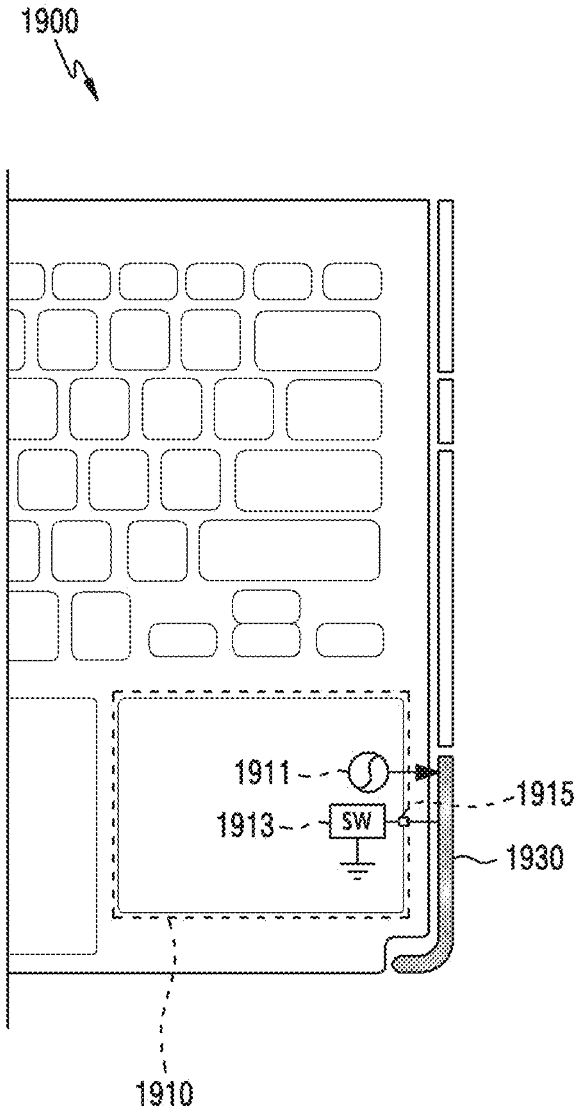
FIG. 19 is a diagram illustrating an example method of using, as an antenna, a conductive part included in an electronic device according to various embodiments.

FIG. 19 is a diagram illustrating an example method of using, as an antenna, a conductive part included in an electronic device according to various embodiments.

Referring to FIG. 19, at least one conductive part 1930 (e.g., conductive part 221 to 229) arranged at a side surface portion of an electronic device 1900 (e.g., electronic device 200) may be used as an antenna radiator. The at least one conductive part 1930 may be connected to a feeder unit (or feeder circuit) 1911 and a ground unit that are prepared in a printed circuit board 1910 (e.g., printed circuit board 250), and may operate as an antenna radiator that is fed by the feeder unit 1911 and forms resonance. According to an embodiment, the at least one conductive part 1930 may operate as an antenna radiator for connecting to a portable electronic device 700 by wireless communication (e.g., Bluetooth communication).

According to an embodiment, when the electronic device 1900 is arranged to overlap (or is fastened to) the portable electronic device 700 (e.g., when the electronic device 1900 is used placed on a lower end portion of the portable electronic device 700), antenna radiation performance using the at least one conductive part 1930 of the electronic device 1900 may be deteriorated due to the influence of an antenna, and/or a change of impedance, of the portable electronic device 700. To address this problem, the electronic device 1900 may have a ground switch structure for impedance adjustment. For example, the at least one conductive part 1930 may be connected to a ground switch 1913. According to an embodiment, a matching circuit unit 1915 may be arranged between the ground switch 1913 and the at least one conductive part 1930 or between the ground switch 1913 and the ground unit. The matching circuit unit 1915 may act as a variable element.

Figure 20:
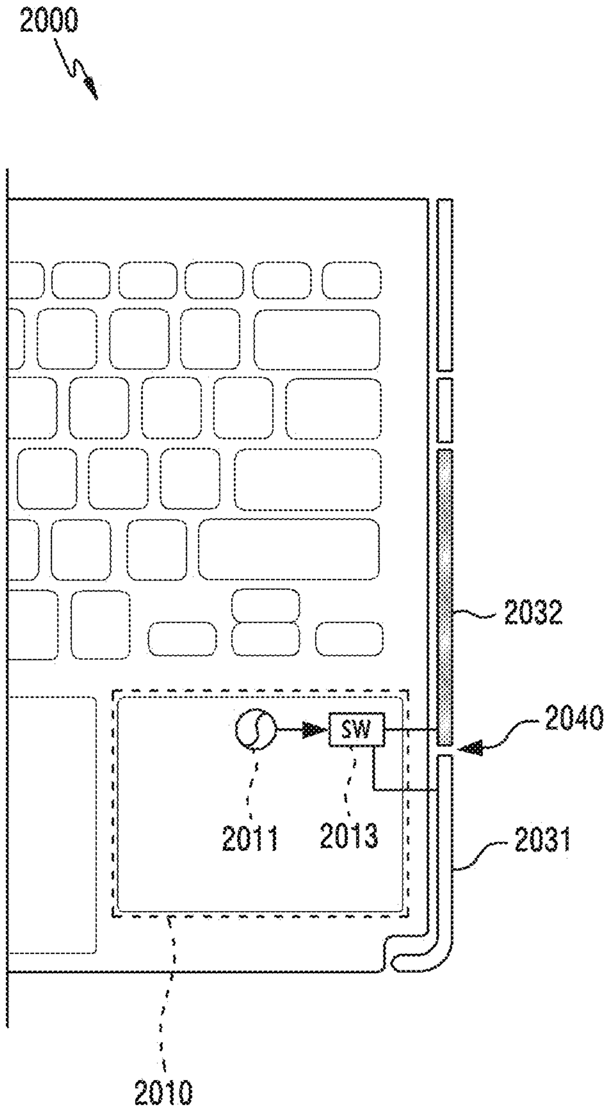
FIG. 20 is a diagram illustrating an example method of using, as an antenna, a conductive part included in an electronic device according to various embodiments.

FIG. 20 is a diagram illustrating an example method of using, as an antenna, a conductive part included in an electronic device according to various embodiments.

Referring to FIG. 20, at least one conductive part 2031 or 2032 (e.g., conductive part 221 to 229) arranged at a side surface portion of an electronic device 2000 (e.g., electronic device 200) may be used as an antenna radiator. The at least one conductive part 2031 or 2032 may be connected to a feeder unit (or feeder circuit) 2011 and a ground unit (not shown) that are prepared in a printed circuit board 2010 (e.g., printed circuit board 250), and may operate as an antenna radiator that is fed by the feeder unit 2011 and forms resonance. According to an embodiment, the at least one conductive part 2031 or 2032 may operate as an antenna radiator for connecting to a portable electronic device 700 by wireless communication (e.g., Bluetooth communication).

According to an embodiment, when the electronic device 2000 is arranged to overlap (or is fastened to) the portable electronic device 700 (e.g., when the electronic device 2000 is used placed on a lower end portion of the portable electronic device 700), antenna radiation performance using the at least one conductive part 2031 or 2032 of the electronic device 2000 may be deteriorated due to the influence of an antenna, and/or a change of impedance, of the portable electronic device 700. To address this, the electronic device 2000 may have a switch structure for changing a conductive part used as an antenna radiator. For example, the electronic device 2000 may include the first conductive part 2031 arranged along a portion of a side surface portion of the electronic device 2000, the second conductive part 2032 arranged along another portion of the side surface portion of the electronic device 2000, and a segmentation portion 2040 formed between the first conductive part 2031 and the second conductive part 2032 and electrically isolating the first conductive part 2031 from the second conductive part 2032. In this case, the first conductive part 2031 and the second conductive part 2032 may be selectively electrically connected to the feeder unit 2011 by a switch 2013 connected to the feeder unit 2011. In an example, when any one of conductive members arranged at a side surface portion of a housing of the portable electronic device 700 supports a frequency band identical to a communication frequency band supported by the electronic device 2000, the electronic device 2000 may electrically connect a conductive part (e.g., second conductive part 2032) not arranged at a position overlapping (or aligned) with the conductive member among conductive parts (e.g., first conductive part 2031 and second conductive part 2032) arranged at the side surface portion of the electronic device 2000, to the switch 2013, and use the connected conductive part as an antenna radiator of the electronic device 2000. When the electronic device 2000 approaches the portable electronic device 700 and respective antenna portions of the electronic device 2000 and the portable electronic device 700 overlap each other, the electronic device 2000 may change the antenna portion of the electronic device 2000 using the switch 2013. This may be substantially identically applied to the portable electronic device 700 as well as the electronic device 2000. For example, when the first conductive part 2031 of the electronic device 2000 operates as a BT communication antenna, and an antenna of the portable electronic device 700 arranged to overlap the first conductive part 2031 also operates as a BT communication antenna, the electronic device 2000 may electrically connect the second conductive part 2032 to the feeder unit 2011 using the switch 2013 and operate the second conductive part 2032 as a BT communication antenna.

Figure 21:
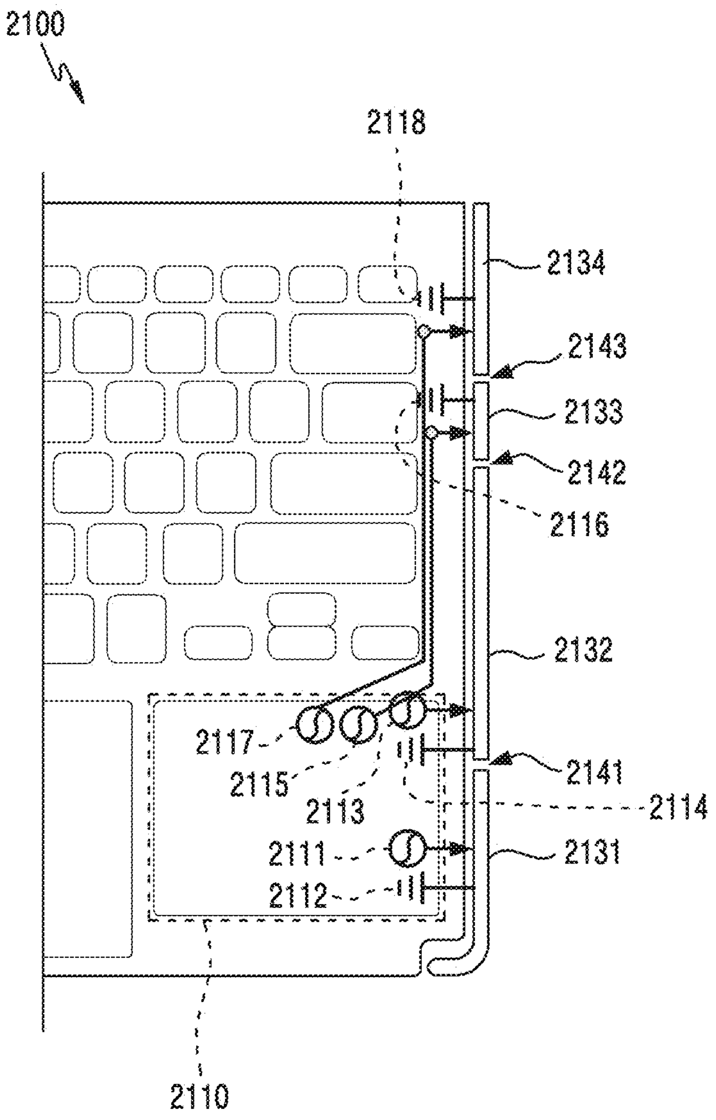
FIG. 21 is a diagram illustrating an example method of using, as antennas, a plurality of conductive parts included in an electronic device according to various embodiments.

FIG. 21 is a diagram illustrating an example method of using, as an antenna, a plurality of conductive parts included in an electronic device according to various embodiments.

Referring to FIG. 21, a plurality of conductive parts 2131, 2132, 2133 and 2134 (e.g., conductive parts 221 to 229) arranged at a side surface portion of an electronic device 2100 (e.g., electronic device 200) may be used as antenna radiators. The plurality of conductive parts 2131, 2132, 2133 and 2134 may be connected to a feeder unit (or feeder circuit) and a ground unit that are prepared in a printed circuit board 2110 (e.g., printed circuit board 250), and may operate as the antenna radiators that are fed by the feeder unit and form resonance. For example, the electronic device 2100 may include the first conductive part 2131 arranged along a first part of the side surface portion of the electronic device 2100, the second conductive part 2132 arranged along a second part of the side surface portion of the electronic device 2000, the third conductive part 2133 arranged along a third part of the side surface portion of the electronic device 2000, the fourth conductive part 2134 arranged along a fourth portion of the side surface portion of the electronic device 2000, a first segmentation portion 2141 formed between the first conductive part 2131 and the second conductive part 2132 and electrically isolating the first conductive part 2131 from the second conductive part 2132, a second segmentation portion 2142 formed between the second conductive part 2132 and the third conductive part 2133 and electrically isolating the second conductive part 2132 from the third conductive part 2133, and a third segmentation portion 2143 formed between the third conductive part 2133 and the fourth conductive part 2134 and electrically isolating the third conductive part 2133 from the fourth conductive part 2134. In an embodiment, the first conductive part 2131 may be connected to a first feeder unit 2111 and a first ground unit 2112. The second conductive part 2132 may be connected to a second feeder unit 2113 and a second ground unit 2114. The third conductive part 2133 may be connected to a third feeder unit 2115 and a third ground unit 2116. The fourth conductive part 2134 may be connected to a fourth feeder unit 2117 and a fourth ground unit 2118. According to an embodiment, the plurality of conductive parts 2131, 2132, 2133 and 2134 may operate as the antenna radiators for connecting to a portable electronic device 700 by wireless communication (e.g., Bluetooth communication).

According to an embodiment, the electronic device 2100 may analyze a signal of an antenna that uses each of the plurality of conductive parts 2131, 2132, 2133 and 2134 varying depending on the usage environment. For example, based on the result of analyzing the signal of the antenna that uses each of the plurality of conductive parts 2131, 2132, 2133 and 2134, the electronic device 2100 may select a conductive part having the most suitable signal characteristics among the plurality of conductive parts 2131, 2132, 2133 and 2134, and use the selected conductive part as the antenna radiator.

As described above, according to various example embodiments, an electronic device (e.g., electronic device 200) may include: a housing (e.g., housing 210) including a first surface facing in a first direction, a second surface facing a second direction opposite to the first direction, and a side surface surrounding at least a portion of a space between the first surface and the second surface, a first conductive part (e.g., conductive parts 221 to 229) including a conductive material arranged along a first part of the side surface portion, a second conductive part (e.g., conductive parts 221 to 229) including a conductive material arranged along a second part of the side surface, a first segmentation portion (e.g., segmentation portions 201 to 208) including a non-conductive material formed between the first conductive part and the second conductive part, and electrically isolating the first conductive part from the second conductive part, a keyboard (e.g., keyboard 230) exposed to an outside through the first surface, a communication circuit arranged inside the housing, and at least one processor, comprising processing circuitry, arranged inside the housing and electrically connected to the keyboard and the communication circuit, and based on the electronic device overlapping a partial area of an external electronic device (e.g., portable electronic device 700), the first segmentation portion of the electronic device may be aligned with a second segmentation portion (e.g., segmentation portions 701 to 708) comprising a non-conductive material arranged at a side surface of a housing of the external electronic device.

According to various example embodiments, the housing of the external electronic device may include a first part (e.g., first part 711) and a second part (e.g., second part 712) physically isolated from the first part, the first part being connected to the second part through a hinge structure (e.g., hinge structure 713) including a hinge, and the first part and the second part configured to be rotated by the hinge structure, and based on the electronic device overlapping a first area on the second part of the external electronic device, the first segmentation portion of the electronic device may be aligned with the second segmentation portion arranged at a side surface of the second part of the housing of the external electronic device.

According to various example embodiments, the electronic device may further include: a third conductive part (e.g., conductive parts 221 to 229) including a conductive material arranged along a third part of the side surface, and a third segmentation portion (e.g., segmentation portions 201 to 208) including a non-conductive material formed between the second conductive part and the third conductive part, and electrically isolating the second conductive part from the third conductive part, and based on the electronic device being arranged to overlap the first area on the second part of the external electronic device, the third segmentation portion of the electronic device may be aligned with a fourth segmentation portion (e.g., segmentation portions 701 to 708) including a non-conductive material arranged at the side surface of the second part of the housing of the external electronic device.

According to various example embodiments, the electronic device may further include a third conductive part including a conductive material arranged along a third part of the side surface, and a third segmentation portion (e.g., segmentation portion 1301) including a non-conductive material formed between the second conductive part and the third conductive part, and electrically isolating the second conductive part from the third conductive part, and based on the electronic device being arranged to overlap a second area different from the first area on the second part of the external electronic device, the second segmentation portion arranged at the side surface of the second part of the housing of the external electronic device may not be aligned with the first segmentation portion of the electronic device and be aligned with the third segmentation portion of the electronic device.

According to various example embodiments, in a state where the electronic device is arranged to overlap a partial area of the external electronic device, based on the housing of the external electronic device being fully folded and the first part facing the second part, the first segmentation portion of the electronic device may be aligned with the second segmentation portion arranged at the side surface of the second part of the housing of the external electronic device and a third segmentation portion (e.g., segmentation portions 731 to 738) arranged at a side surface of the first part of the housing of the external electronic device.

According to various example embodiments, the electronic device may further include a third conductive part including a conductive material arranged along a third part of the side surface, and a third segmentation portion (e.g., segmentation portion 1401 or 1402) including a non-conductive material formed between the second conductive part and the third conductive part, and electrically isolating the second conductive part from the third conductive part, and based on the electronic device being arranged adjacent to a lower side surface of the second part of the external electronic device, the third segmentation portion of the electronic device may be aligned with a fourth segmentation portion (e.g., segmentation portion 704 or 708) including a non-conductive material arranged at the lower side surface of the second part of the housing of the external electronic device.

According to various example embodiments, the electronic device may further include at least one first fastener (e.g., fastening members 241 or 246) arranged at an inner side of the side surface portion of the housing, and based on the electronic device being arranged to overlap a partial area of the external electronic device, the at least one first fastener of the electronic device may be configured to be fastened with at least one second fastener (e.g., fastening members 741 or 746) arranged at an inner side of the side surface portion of the housing of the external electronic device.

According to various example embodiments, at least one of the first conductive part or the second conductive part may be electrically connected to the communication circuit and configured to be used as an antenna radiator of the electronic device.

According to various example embodiments, at least one of the first conductive part or the second conductive part may be connected to a ground switch (e.g., ground switch 1913) of the electronic device.

According to various example embodiments, the first conductive part and the second conductive part may be selectively connected to the communication circuit through a switch (e.g., feeder switch 2013) of the electronic device.

As described above, according to various example embodiments, an electronic device (e.g., electronic device 200) may include: a housing (e.g., housing 210), a plate (e.g., plate 290) arranged inside the housing, a first conductive part including a conductive material arranged along a first part of a side surface of the plate, a second conductive part including a conductive material arranged along a second part of the side surface of the plate, a first segmentation portion (e.g., segmentation portions 291 to 298) including a non-conductive material formed between the first conductive part and the second conductive part, and configured to electrically isolate the first conductive part from the second conductive part, a keyboard (e.g., keyboard 230) seated on the plate and exposed to an outside, a communication circuit arranged inside the housing, and at least one processor, comprising processing circuitry, arranged inside the housing, and electrically connected to the keyboard and the communication circuit, and based on the electronic device being arranged to overlap a partial area of an external electronic device (e.g., portable electronic device 700), the first segmentation portion of the electronic device may be aligned with a second segmentation portion (e.g., segmentation portions 701 to 708) arranged at a side surface of a housing of the external electronic device.

According to various example embodiments, the housing of the external electronic device may include: a first part (e.g., first part 711) and a second part (e.g., second part 712) physically isolated from the first part, the first part being connected to the second part through a hinge structure (e.g., hinge structure 713) including a hinge, and the first part and the second part being configured to rotate by the hinge structure, the plate may be arranged inside the second part, and based on the electronic device being arranged to overlap a first area on the second part of the external electronic device, the first segmentation portion of the electronic device may be aligned with the second segmentation portion arranged at a side surface of the second part of the housing of the external electronic device.

According to various example embodiments, the electronic device may further include a third conductive part including a conductive material arranged along a third part of the side surface of the plate, and a third segmentation portion (e.g., segmentation portions 291 to 298) including a non-conductive material formed between the second conductive part and the third conductive part, and configured to electrically isolate the second conductive part from the third conductive part, and based on the electronic device being arranged to overlap the first area on the second part of the external electronic device, the third segmentation portion of the electronic device may be aligned with a fourth segmentation portion (e.g., segmentation portions 701 to 708) including a non-conductive material arranged at the side surface of the second part of the housing of the external electronic device.

According to various example embodiments, the electronic device may further include a third conductive part including a conductive material arranged along a third part of the side surface of the plate, and a third segmentation portion (e.g., segmentation portion 1301) including a non-conductive material formed between the second conductive part and the third conductive part, and configured to electrically isolate the second conductive part from the third conductive part, and based on the electronic device being arranged to overlap a second area different from the first area on the second part of the external electronic device, the second segmentation portion arranged at the side surface portion of the second part of the housing of the external electronic device may not be aligned with the first segmentation portion of the electronic device and be aligned with the third segmentation portion of the electronic device.

According to various example embodiments, in a state where the electronic device is arranged to overlap a partial area of the external electronic device, based on the housing of the external electronic device being fully folded and the first part facing the second part, the first segmentation portion of the electronic device may be aligned with the second segmentation portion arranged at the side surface of the second part of the housing of the external electronic device and a third segmentation portion (e.g., segmentation portions 731 to 738) including a non-conductive material arranged at a side surface of the first part of the housing of the external electronic device.

According to various example embodiments, the electronic device may further include: a third conductive part including a conductive material arranged along a third part of the side surface of the plate, and a third segmentation portion (e.g., segmentation portion 1401 or 1402) including a non-conductive material formed between the second conductive part and the third conductive part, and configured to electrically isolate the second conductive part from the third conductive part, and based on the electronic device being arranged adjacent to a lower side surface of the second part of the external electronic device, the third segmentation portion of the electronic device may be aligned with a fourth segmentation portion (e.g., segmentation portion 704 or 708) including a non-conductive material arranged at the lower side surface of the second part of the housing of the external electronic device.

According to various example embodiments, the electronic device may further include: at least one first fastener (e.g., fastening members 241 or 246) arranged at an inner side of the side surface portion of the housing, and based on the electronic device being arranged to overlap a partial area of the external electronic device, the at least one first fastener of the electronic device may be fastened with at least one second fastener (e.g., fastening members 741 or 746) arranged at an inner side of the side surface of the housing of the external electronic device.

According to various example embodiments, at least one of the first conductive part or the second conductive part may be electrically connected to the communication circuit and configured to be used as an antenna radiator of the electronic device.

According to various example embodiments, at least one of the first conductive part or the second conductive part may be connected to a ground switch (e.g., ground switch 1913) of the electronic device.

According to various example embodiments, the first conductive part and the second conductive part may be selectively connected to the communication circuit through a switch (e.g., feeder switch 2013) of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing configured to be removably fastened to an external electronic device, the housing comprising a first surface facing a first direction, a second surface facing a second direction opposite to the first direction, and a side surface surrounding at least a portion of a space between the first surface and the second surface;

a first conductive part comprising a conductive material arranged along a first part of the side surface;

a second conductive part comprising a conductive material arranged along a second part of the side surface;

a first segmentation portion comprising a non-conductive material disposed between the first conductive part and the second conductive part, and configured to electrically isolate the first conductive part from the second conductive part;

a keyboard exposed to an outside through the first surface;

a communication circuit arranged inside the housing; and at least one processor, comprising processing circuitry, arranged inside the housing and electrically connected to the keyboard and the communication circuit, wherein, based on the electronic device being removably fastened to an external electronic device such that the electronic device overlaps a partial area of the external electronic device configured to be foldable by a hinge structure, the first segmentation portion is aligned with a second segmentation portion comprising a non-conductive material arranged at a side surface of a housing of the external electronic device.

2. The electronic device of claim 1, wherein the housing of the external electronic device comprises a first part and a second part physically isolated from the first part, the first part being connected to the second part through the hinge structure comprising a hinge, and the first part and the second part configured to be rotated by the hinge structure, and based on the electronic device being arranged to overlap a first area on the second part of the external electronic device, the first segmentation portion is aligned with the second segmentation portion arranged at a side surface of the second part.

3. The electronic device of claim 2, further comprising:

a third conductive part comprising a conductive material arranged along a third part of the side surface; and a third segmentation portion comprising a non-conductive material disposed between the second conductive part and the third conductive part, and configured to electrically isolate the second conductive part from the third conductive part, wherein, based on the electronic device being arranged to overlap the first area on the second part of the external electronic device, the third segmentation portion is aligned with a fourth segmentation portion comprising a non-conductive material arranged at the side surface portion of the second part.

4. The electronic device of claim 2, further comprising:

a third conductive part comprising a conductive material arranged along a third part of the side surface; and a third segmentation portion comprising a non-conductive material disposed between the second conductive part and the third conductive part, and configured to electrically isolate the second conductive part from the third conductive part, wherein, based on the electronic device being arranged to overlap a second area different from the first area on the second part of the external electronic device, the second segmentation portion arranged at the side surface of the second part is not aligned with the first segmentation portion and is aligned with the third segmentation portion.

5. The electronic device of claim 2, wherein in a state where the electronic device is arranged to overlap a partial area of the external electronic device, based on the housing of the external electronic device being fully folded and the first part facing the second part, the first segmentation portion is aligned with the second segmentation portion arranged at the side surface of the second part and a third segmentation portion comprising a non-conductive material arranged at a side surface of the first part.

6. The electronic device of claim 2, further comprising:

a third conductive part comprising a conductive material arranged along a third part of the side surface; and a third segmentation portion comprising a non-conductive material disposed between the second conductive part and the third conductive part, and configured to electrically isolate the second conductive part from the third conductive part, wherein, based on the electronic device being arranged adjacent to a lower side surface of the second part of the external electronic device, the third segmentation portion is aligned with a fourth segmentation portion comprising a non-conductive material arranged at the lower side surface of the second part.

7. The electronic device of claim 1, further comprising at least one first fastener arranged at an inner side of the side surface of the housing, wherein, based on the electronic device being arranged to overlap a partial area of the external electronic device, the at least one first fastener is configured to be fastened with at least one second fastener arranged at an inner side of the side surface of the housing of the external electronic device.

8. The electronic device of claim 1, wherein at least one of the first conductive part or the second conductive part is configured to be electrically connected to the communication circuit and used as an antenna radiator, and at least one of the first conductive part or the second conductive part is connected to a ground switch.

9. The electronic device of claim 1, wherein the first conductive part and the second conductive part are selectively connected to the communication circuit through a switch.

10. An electronic device comprising:

a housing configured to be removably fastened to an external electronic device;

a plate arranged inside the housing;

a first conductive part comprising a conductive material arranged along a first part of a side surface of the plate;

a second conductive part comprising a conductive material arranged along a second part of the side surface of the plate;

a first segmentation portion comprising a non-conductive material disposed between the first conductive part and the second conductive part, and configured to electrically isolate the first conductive part from the second conductive part;

a keyboard seated on the plate and exposed to an outside;

a communication circuit arranged inside the housing; and at least one processor, comprising processing circuitry, arranged inside the housing, and electrically connected to the keyboard and the communication circuit, wherein, based on the electronic device being removably fastened to an external electronic device such that the electronic device overlaps a partial area of the external electronic device configured to be foldable by a hinge structure, the first segmentation portion is aligned with a second segmentation portion comprising a non-conductive material arranged at a side surface of a housing of the external electronic device.

11. The electronic device of claim 10, wherein the housing of the external electronic device comprises a first part and a second part physically isolated from the first part, the first part being connected to the second part through the hinge structure comprising a hinge, and the first part and the second part are configured to be rotated by the hinge structure, the plate is arranged inside the second part, and based on the electronic device being arranged to overlap a first area on the second part of the external electronic device, the first segmentation portion is aligned with the second segmentation portion arranged at a side surface of the second part.

12. The electronic device of claim 11, further comprising:

a third conductive part comprising a conductive material arranged along a third part of the side surface of the plate; and a third segmentation portion comprising a non-conductive material disposed between the second conductive part and the third conductive part, and configured to electrically isolate the second conductive part from the third conductive part, wherein, based on the electronic device being arranged to overlap the first area on the second part of the external electronic device, the third segmentation portion is aligned with a fourth segmentation portion comprising a non-conductive material arranged at the side surface of the second part.

13. The electronic device of claim 11, further comprising:

a third conductive part comprising a conductive material arranged along a third part of the side surface of the plate; and a third segmentation portion comprising a non-conductive material disposed between the second conductive part and the third conductive part, and configured to electrically isolate the second conductive part from the third conductive part, wherein, based on the electronic device being arranged to overlap a second area different from the first area on the second part of the external electronic device, the second segmentation portion arranged at the side surface of the second part is not aligned with the first segmentation portion and is aligned with the third segmentation portion.

14. The electronic device of claim 11, wherein in a state where the electronic device is arranged to overlap a partial area of the external electronic device, based on the housing of the external electronic device being fully folded and the first part facing the second part, the first segmentation portion is aligned with the second segmentation portion arranged at the side surface portion of the second part and a third segmentation portion comprising a non-conductive material arranged at a side surface of the first part.

15. The electronic device of claim 11, further comprising:

a third conductive part comprising a conductive material arranged along a third part of the side surface of the plate; and a third segmentation portion comprising a non-conductive material disposed between the second conductive part and the third conductive part, and configured to electrically isolate the second conductive part from the third conductive part, wherein, based on the electronic device being arranged adjacent to a lower side surface of the second part of the external electronic device, the third segmentation portion is aligned with a fourth segmentation portion comprising a non-conductive material arranged at the lower side surface of the second part.

16. The electronic device of claim 10, further comprising at least one first fastener arranged at an inner side of the side surface of the housing, wherein, based on the electronic device being arranged to overlap a partial area of the external electronic device, the at least one first fastener is configured to be fastened with at least one second fastener arranged at an inner side of the side surface of the housing of the external electronic device.

17. The electronic device of claim 10, wherein at least one of the first conductive part or the second conductive part is configured to be electrically connected to the communication circuit and used as an antenna radiator.

18. The electronic device of claim 17, wherein at least one of the first conductive part or the second conductive part is connected to a ground switch.

19. The electronic device of claim 10, wherein the first conductive part and the second conductive part are selectively connected to the communication circuit through a switch.

20. A system comprising:

the electronic device of claim 1; and the external electronic device.

21. A system comprising:

the electronic device of claim 10; and the external electronic device.

22. A method for preventing or reducing degradation of antenna radiation performance of a portable external electronic device with an electronic device, the electronic device comprising: a housing configured to be removably fastened to the portable external electronic device, the housing comprising a first surface facing a first direction, a second surface facing a second direction opposite to the first direction, and a side surface surrounding at least a portion of a space between the first surface and the second surface; a first conductive part comprising a conductive material arranged along a first part of the side surface; a second conductive part comprising a conductive material arranged along a second part of the side surface; a first segmentation portion comprising a non-conductive material disposed between the first conductive part and the second conductive part, and configured to electrically isolate the first conductive part from the second conductive part; a keyboard exposed to an outside through the first surface; a communication circuit arranged inside the housing; and at least one processor, comprising processing circuitry, arranged inside the housing and electrically connected to the keyboard and the communication circuit, the method comprising:

removably fastening the electronic device to the portable external electronic device such that the electronic device overlaps a partial area of the portable external electronic device configured to be foldable by a hinge structure, and the first segmentation portion is aligned with a second segmentation portion comprising a non-conductive material arranged at a side surface of a housing of the portable external electronic device.

23. A method for preventing or reducing degradation of antenna radiation performance of a portable external electronic device with an electronic device, the electronic device comprising: a housing configured to be removably fastened to the portable external electronic device; a plate arranged inside the housing; a first conductive part comprising a conductive material arranged along a first part of a side surface of the plate; a second conductive part comprising a conductive material arranged along a second part of the side surface of the plate; a first segmentation portion comprising a non-conductive material disposed between the first conductive part and the second conductive part, and configured to electrically isolate the first conductive part from the second conductive part; a keyboard seated on the plate and exposed to an outside; a communication circuit arranged inside the housing; and at least one processor, comprising processing circuitry, arranged inside the housing, and electrically connected to the keyboard and the communication circuit, the method comprising:

removably fastening the electronic device to the portable external electronic device such that the electronic device overlaps a partial area of the portable external electronic device configured to be foldable by a hinge structure, and the first segmentation portion is aligned with a second segmentation portion comprising a non-conductive material arranged at a side surface of a housing of the portable external electronic device.

* * * * *